US012462673B2

(12) United States Patent
Murphy

(10) Patent No.: US 12,462,673 B2
(45) Date of Patent: Nov. 4, 2025

(54) ROAD SAFETY HOTSPOT LOCATION IDENTIFICATION AND REPORTING SYSTEM AND METHOD

(71) Applicant: Emmett Murphy, Cork (IE)

(72) Inventor: Emmett Murphy, Cork (IE)

( * ) Notice: Subject to any disclaimer, the term of this patent is extended or adjusted under 35 U.S.C. 154(b) by 150 days.

(21) Appl. No.: 18/488,279

(22) Filed: Oct. 17, 2023

(65) Prior Publication Data

US 2024/0071209 A1 Feb. 29, 2024

Related U.S. Application Data

(63) Continuation of application No. 17/215,210, filed on Mar. 29, 2021, now Pat. No. 11,830,357.

(60) Provisional application No. 63/006,515, filed on Apr. 7, 2020.

(51) Int. Cl.
*G08G 1/005* (2006.01)

(52) U.S. Cl.
CPC .................................... *G08G 1/005* (2013.01)

(58) Field of Classification Search
CPC .... G08G 1/005; G08G 1/0112; G08G 1/0116; G08G 1/0133; G08G 1/0145; G08G 1/08; G08G 1/096716; G08G 1/096741; G08G 1/096775; G08G 1/096783
See application file for complete search history.

(56) References Cited

U.S. PATENT DOCUMENTS

| | | | | |
|---|---|---|---|---|
| 10,078,961 B2 * | 9/2018 | Ruenz | .................... | G08G 1/164 |
| 11,006,264 B1 * | 5/2021 | Takla | .................... | H04W 28/22 |
| 2021/0304607 A1 * | 9/2021 | Grace | .................... | G08G 1/166 |

* cited by examiner

*Primary Examiner* — Quan Zhen Wang
*Assistant Examiner* — Rajsheed O Black-Childress

(57) ABSTRACT

An approach is provided for identifying and reporting road safety hotspot locations. The approach, for example, involves receiving a Vulnerability State Message from at least one Road User Device associated with a Road User. The Vulnerability State Message includes positional data and vulnerability state factor data, which may indicate an elevated road safety risk. This data is collated with other Vulnerability State data received from other Road User Devices associated with other Road Users concurrently located in the same geographic area. The approach also involves calculating a Vulnerability State summary value for each Road User, and an aggregate Vulnerability State summary value for the geographic area. The approach further involves reporting the geographic area as a Vulnerability Hotspot Location when the aggregate Vulnerability State summary value is determined to be above a threshold amount.

15 Claims, 18 Drawing Sheets

ROAD SAFETY HOTSPOT LOCATION IDENTIFICATION AND REPORTING SYSTEM AND METHOD

RELATED APPLICATIONS

This application is a continuation of and claims the benefit of priority to U.S. application Ser. No. 17/215,210, filed Mar. 29, 2021, which claims priority to U.S. Provisional Patent Application No. 63/006,515, filed Apr. 7, 2020.

FEDERALLY SPONSORED RESEARCH

Nonapplicable.

SEQUENCE LISTING OR PROGRAM

Nonapplicable.

FIELD OF THE DISCLOSURE

The present disclosure relates to improving the safety of Vulnerable Road Users, such as pedestrians, cyclists, motorcyclists and other Road Users, in a connected transportation infrastructure. More particularly, it relates to generating, collecting and processing data from electronic devices associated with Road Users, vehicles and roadside locations to enable real-time and retrospective active traffic reporting.

BACKGROUND

Each year, an estimated 1.35 million people die in road traffic collisions. Vulnerable Road Users, including pedestrians, cyclists, motorcyclists and other Road Users, represent 54% of all such deaths. Amongst Vulnerable Road Users, vulnerability is higher amongst some groups than others; including the elderly, disabled persons and children. Vulnerability is also higher, for example, in areas of poor transportation infrastructure, in areas where different travel modes share the same road space, at times of poor visibility and at times of high traffic throughput.

Technologies for improving Road User safety may be divided broadly into passive safety technologies and active safety technologies. Passive safety technologies are used to limit injury in the case of an accident. Active safety technologies are used to anticipate and prevent accidents. The field of active safety technologies is seen as a key instrument for improving road safety as advances in wireless communication technologies and data processing technologies enable transportation infrastructure to become more connected.

The protection of Vulnerable Road Users in a transportation system is increasingly becoming a focus of active safety technologies in the field of intelligent transportation systems. This is driven primarily by the emergence of connected and autonomous vehicles (CAV), which enable new opportunities to anticipate and prevent collisions using vehicle-to-everything (V2X), including vehicle-to-pedestrian (V2P) and vehicle-to-vehicle (V2V), technologies. To date, such technologies have largely focused on enabling an on-board vehicle system to detect and identify a potential collision with a Vulnerable Road User in real time and take or suggest corrective action to avoid a collision.

The detection step in such a system is typically unidirectional and involves an array of sensing technologies (e.g. long-range radar, short-range radar, camera imaging, LiDAR, sonar, GPS, etc.). When combined with intensive data processing capabilities (e.g. machine learning algorithms, artificial intelligence, HD 3D maps, etc.), it is possible to classify nearby objects with increasing accuracy over time. However, such systems remain both computationally and financially expensive, and have proven vulnerable to environmental conditions—particularly outside of the context of predictable and reliable transportation infrastructure design in urban environments.

More recently, CAV systems have started to test bidirectional communications between the CAV system and systems associated with a Vulnerable Road User. For example, emerging device-to-device direct communications, such as Cellular Vehicle-to-Everything (C-V2X) and 802.11p-based Dedicated Short-Range Communications (DSRC), can potentially enable a CAV system to communicate a V2P alert to a known Vulnerable Road User system in real time.

However, all of the approaches of using V2X technologies to improve road safety heretofore known suffer from a number of significant disadvantages:

a) Specifically, V2X systems attempt to prevent collisions by focusing on enabling real-time collision alerts. These collision alerts focus on a determination of whether the vehicle is likely about to collide with the detected Road User. This determination may then be communicated to the driver of the vehicle, an Advanced Driver Assistance System associated with the vehicle, an active road network monitoring system, or a device associated with a Road User. In all these cases, this approach is vulnerable to latency in data communications, as any delay increases the likelihood of a collision. Real-time collision alerts are also merely a final last-gasp attempt to protect the Vulnerable Road User, occurring immediately prior to a potential collision.

b) V2X systems also attempt to classify Vulnerable Road Users as a binary state; a determination of whether the two objects are about to collide, or not. This is to enable the triggering of an alert to any individual Road User on course for collision. By viewing Road User vulnerability through a narrow lens of collision determination, V2X systems exclude the possibility that the vulnerability of a particular Vulnerable Road User is far more complex than simply its position and relative movement or trajectory.

c) V2X technologies attempt to identify Road Users based on unilateral (e.g. sensor-based) detection and analysis, which is vulnerable to environmental conditions (lighting, weather, skin color, human pose variation, traffic flow, object surface material, obstacles, etc.). The V2X system is focused only on sensing and classifying object data within its immediate nearby vicinity to determine whether a collision is about to occur. This excludes the possibility that data from a wider geography may be helpful in anticipating and preventing a collision.

d) V2X systems are computationally expensive, typically involving huge amounts of data that is continuously collected, processed and analyzed. Each collision alert is the result of intensive data processing. Retrospective analysis of such data for the purposes of improving a CAV's system algorithms, even for a single CAV system, can require extensive periods of download time to local servers. This is particularly true of fully autonomous vehicles, as the amount of data collected in a single day for a single vehicle system is too much to efficiently communicate remotely. The collection and storage of such data for multiple vehicles quickly becomes too complicated to enable server-based active traffic pattern analysis, whether in real time or retrospectively.

e) The objective of CAV road safety applications is to determine a potential collision by focusing on the relative movement of discrete actors on a road segment. This excludes the possibility of systems-level anticipation and prevention improvements based on aggregate data related to other Road Users, or other potential systems causes of a potential collision.

f) V2X systems are vehicle-centric, as they focus only on situations in which a vehicle is present. This excludes the possibility that data not related to the vehicle or a situation not involving a vehicle can be useful in the protection of Vulnerable Road Users.

g) V2X systems are governed by a set of rules for determining a collision hierarchy. For example, a V2X may allow a collision with a plastic bag, but trigger avoidance driving behavior for a more substantial category of object such as a human. The rules for determining a collision hierarchy have a limited focus on object categories and the relative position of those objects in a decision tree. This affords collision determination rules to focus only on decisions between types of objects or counts of those types of objects.

SUMMARY

Details of one or more embodiments of the disclosure described in this specification are set forth in the accompanying drawings and the description below. Other features, aspects, and advantages will become apparent from the description, the drawings, and the claims.

An exemplary embodiment of the disclosure provides a Road User Vulnerability State Classification system and method. The system includes at least one Road User Device and a Vulnerability State Server. The Road User Device may comprise at least one of a user interface for enabling user interaction, a wireless transceiver with means for device-to-device and data network communications, a processor, environmental sensors, memory, biometric sensors and an application processor, or any combination thereof. The Vulnerability State Server may be associated with an active network monitoring system and comprise a processor; communications means with a data network, such as the Internet; and at least one repository of memory. At least one of the Road User Device and the Vulnerability State Server may implement the method of Road User Vulnerability State classification by receiving data related to a set of known Vulnerability State Factors, storing updates to the Road User's Vulnerability State Factors in memory, referencing the Vulnerability State calculation rules, and calculating the Road User's Vulnerability State. This method of Vulnerability State classification may be implemented continuously, periodically upon a time interval, occasionally, upon a change being detected in at least one Vulnerability State Factor, upon receipt of a Vulnerability State Message, or upon other timings.

In accordance with another embodiment, the present disclosure provides a system and method for communicating a Road User's Vulnerability State. The system includes a first Road User Device associated with a Vulnerable Road User for communicating their Vulnerability State. The system may further include a second Road User Device associated with a Vehicle, which may be operated by a Driver, for V2X communications. The system further includes a Vulnerability State Server for receiving, storing and sending Vulnerability State Messages associated with at least one of the first device and second device. The system is configured to communicate a Vulnerability State Message via at least one of the first device, the second device and the Vulnerability State Server and to at least one of the first device, the second device and the Vulnerability State Server. The method for sending the Vulnerability State Message may be initiated upon a determination that the Vulnerability State of at least one Road User increases above a predetermined threshold amount. The Vulnerability State Message may be communicated using direct device-to-device communications means or using communications means over a data network, such as the Internet. A Vulnerability State Message may contain an identifying attribute for associating the Vulnerability State Message with at least one Road User, Roadside Unit or geographic area.

In accordance with another embodiment, the present disclosure provides a system and method of Vulnerability Hotspot Location reporting for identifying and reporting geographic areas at which there may exist an elevated road safety risk. The system includes at least one Road User Device for communicating the Vulnerability State of the Road User. The system further includes a Vulnerability State Server for sending, receiving, storing and analyzing Vulnerability State Messages. The system is configured to communicate a Vulnerability State Message via at least one of the Road User Device and the Vulnerability State Server and to at least one of the Road User Device and the Vulnerability State Server. The system is further configured to store the Vulnerability State Message in the Vulnerability State Server. The method of Vulnerability Hotspot Location reporting may be implemented by the Vulnerability State Server. The method includes collecting Vulnerability State Messages, storing the Vulnerability State Messages in memory, collating Vulnerability State Messages associated with a geographic area, calculating an aggregate Vulnerability State for the geographic area, comparing the aggregate Vulnerability State with a threshold amount, and adjusting the Vulnerability Hotspot state of the first geographic area if the aggregate Vulnerability State reaches a threshold value. The system may further be configured to send a Vulnerability State Message to the Road User Device upon the setting of the Vulnerability Hotspot Location. The system may further be configured to send a Vulnerability State Message to a Roadside Unit positioned near a roadway within the geographic area of the Vulnerability Hotspot location for the purposes of communicating with passing traffic.

In accordance with another embodiment, the present disclosure provides a system and method of Roadside Vulnerability Reporting for roadside Vulnerability State communications. The system includes a Roadside Unit positioned close to a roadway segment for V2X communications and presenting information to nearby Road Users. The system further includes a Vulnerability State Server for sending, receiving, storing and analyzing Vulnerability State Messages associated with a geographic area associated with the roadway segment. The system may further include at least one Road User Device for V2X communications. The Roadside Unit may comprise at least one of a User Interface for user interaction, a wireless transceiver for device-to-device communications and data network communications, a processor, memory, environmental sensors, an application processor, means for physical automation, means for visual communication and means for audio communications, or any combination thereof. The system is configured to send a Vulnerability State Message via at least one of the Vulnerability State Server and the Road User Device and to the Roadside Unit. The method of Roadside Vulnerability Reporting includes receiving a Vulnerability State Message at the Roadside Unit, saving the Vulnerability State Message in memory, determining whether the Vulnerability State Message relates to a change in the Vulnerability Hotspot state of the first geographic area or whether it relates to at least one Road User, referencing associated display state rules, determining whether the display state of the Roadside Unit has changed, and communicating a change in the display state of the Roadside Unit to nearby Road Users through at least one of physical automation, visual communications, and audio means; by sending a Vulnerability State Message through direct or data network communications; or through other means.

In accordance with another embodiment, the present disclosure provides a system and method of Roadway Incident Black Box reporting, for collating Vulnerability State data and presenting the data for analytical purposes. The system includes at least one Road User Device associated with a Road User for sending and receiving Vulnerability State Messages. The system further includes a Vulnerability State Server for storing and collating Vulnerability State Messages as Roadway Incident Black Box evidence packages. The system is configured to send a Vulnerability State Message from the Road User Device to the Vulnerability State Server over a data network. The method of Roadway Incident Black Box reporting is implemented by the Vulnerability State Server. Upon the Vulnerability State Server identifying a first geographic area as a Vulnerability Hotspot Location, the Vulnerability State Server implements the method by: referencing rules for identifying a Vulnerability Hotspot as a particular Roadway Incident; identifying a specific Roadway Incident; setting a Roadway Incident time period around the time of the occurrence of the Roadway Incident; for the duration of Roadway Incident time period, collating Vulnerability State Messages of Road Users directly associated with the Roadway Incident; collating Vulnerability State Messages of nearby Road Users not directly associated with the Roadway Incident; and saving the collated Vulnerability State Messages as a Roadway Incident Black Box evidence package. The system may further be configured to display a Roadway Incident Black Box evidence package on a user interface associated with at least one of a Roadway Administration System, a Road User device, and other display devices for the purposes of better understanding how the Roadway Incident occurred, adjudicating responsibility, identifying roadway infrastructure improvements, and for other purposes.

Accordingly several advantages of one or more aspects are as follows: to more effectively classify the Vulnerability State of a Road User in accordance with a range of dynamic Vulnerability State Factors; to more efficiently communicate Vulnerability State in a connected transportation infrastructure; to identify and report Vulnerability Hotspot Locations to Road Users so that they can make better decisions that improve their road safety; to provide roadside communications to nearby Road Users based on the Vulnerability State data of Road Users in the area; and to provide Roadway Incident Black box analytical reports as supporting evidence for better understanding a particular Roadway Incident such as a collision or traffic bottleneck.

The foregoing and other aspects and advantages of the disclosure will appear from the following detailed description. In this description, for purposes of explanation, numerous specific details are set forth in order to provide a thorough understanding of the disclosed embodiments. In the description, reference is made to the accompanying drawings which form a part hereof, and in which there is shown by way of illustration exemplary embodiments of the disclosure. Such embodiments do not necessarily represent the full scope of the disclosure, however, and reference is made therefore to the claims and herein for interpreting the scope of the disclosure.

BRIEF DESCRIPTION OF THE DRAWINGS

Like reference numerals will be used to refer to like parts from figure to figure in the following detailed description.

DETAILED DESCRIPTION

Figure 1:
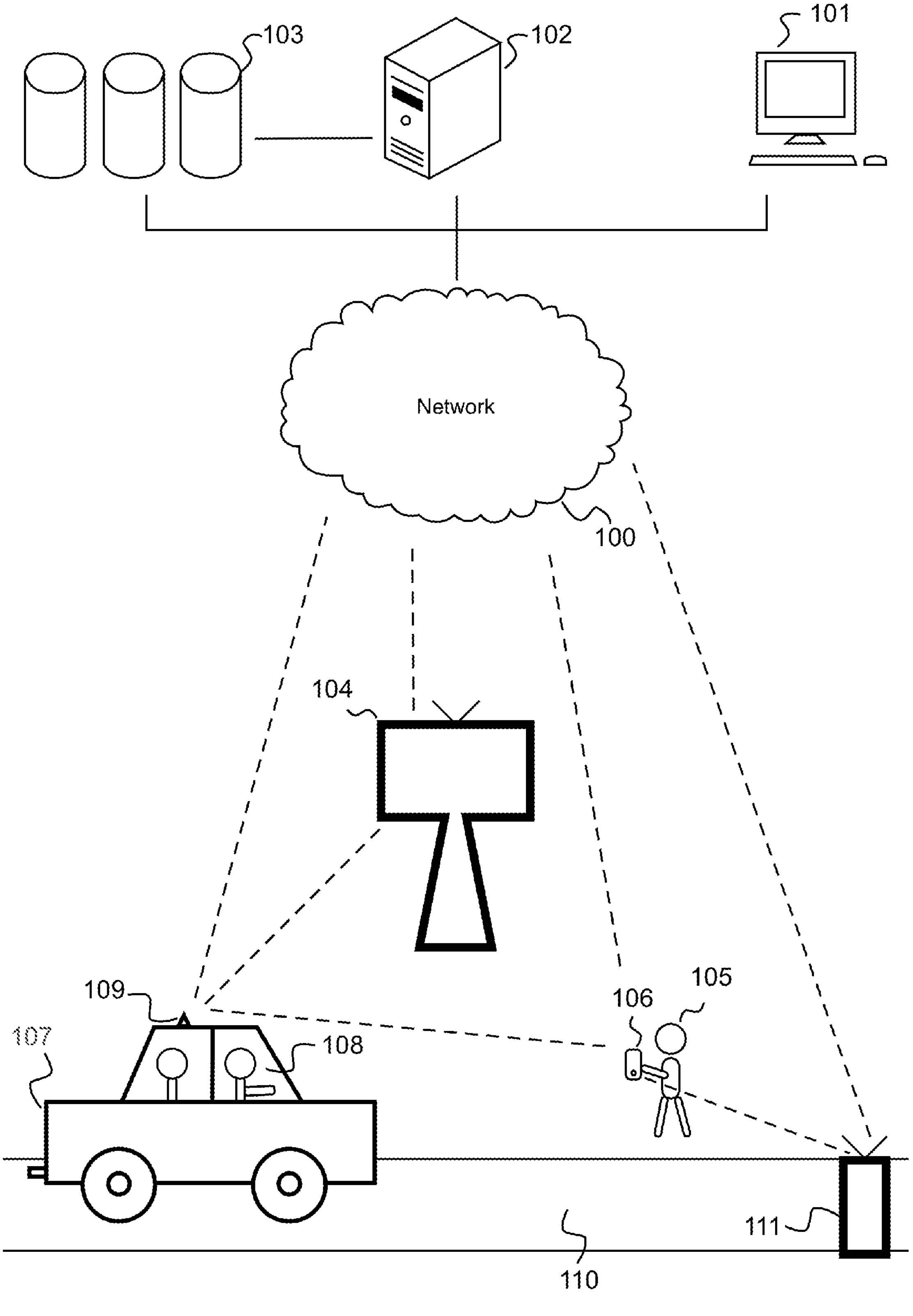
FIG. 1 is a schematic illustration of an exemplary network architecture for implementing various embodiments of the disclosure.

The following description is not to be read in a limiting sense, but is made merely for the purpose of describing the general principles of exemplary embodiments. Reference throughout this specification to "one embodiment," "an embodiment," or similar language, means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

Generally speaking, pursuant to various embodiments, systems and methods are provided for classifying and reporting the Vulnerability State of Road Users in a number of active road traffic scenarios. In the present disclosure, a "Road User" may refer broadly (and without limitation) to living entities (e.g. people, animals) and non-living entities (e.g. vehicles, automated vehicles). The term "Vulnerable Road User" as used herein, may refer broadly (and without limitation) to Road Users that are most vulnerable to personal injury in the context of a road traffic collision. It may include, for example, pedestrians, cyclists, motorcyclists, people on scooters, animals, disabled people, elderly people and children. It may also include, in some cases, a driver of a vehicle, or passengers within the vehicle, as their Vulnerability State is also dynamic and susceptible to periods of high vulnerability. The term "vehicle", as used herein, may refer broadly (and without limitation) to transportation vehicles such as cars, vans, trucks, motorcycles, heavy-goods vehicles, buses, trams, trains, etc., whether controlled by a driver or by automated means (e.g. autonomous vehicle).

In the present disclosure the term "Vulnerability State" may refer to a classification of a Road User (or multiple Road Users, or a geographic area) according to the determined potential of road safety risk, such as a potential collision. Unlike existing V2X systems, which attempt a binary classification of a person or object as on a collision course or not, the present disclosure views Vulnerability State as an array of contributing Vulnerability State Factors that may be dynamic and changing. By attempting to classify Vulnerability State according to these factors at a point (or points) prior to the moment of potential collision, it is possible to better anticipate and prioritize communications that are more likely to prevent a collision than a last-second vehicle-to-passenger alert. Vulnerability State may be reported for a moment in time, as a sequence of moments in time, and over an extended period of time.

In the present disclosure, the term "Roadside Unit" may refer broadly to a hardware unit placed next to, upon, above, beneath or otherwise geographically nearby to a roadway. When positioned upon, above, beneath or otherwise close to a road surface, the Roadside Unit may be referred to as a "Road Surface Unit". The term "roadway" may refer to any form of ground surface used by people or vehicles or animals for surface transportation, including a roadway segment, or intersection, or pathway, or lane, or highway, or other such forms of road network, or any forms of roadway regardless of the type of surface.

The present disclosure describes a connected transportation infrastructure with data communications between electronic devices associated with Road Users (including vehicle Road Users), Roadside Units and a Vulnerability State Server. A connected transportation infrastructure enables a more coordinated, systematic and predictable environment for improving road safety, as opposed to relying on Road Users (including autonomous Road Users) to visually identify and classify Vulnerable Road Users as potential collision objects within their immediate vicinity.

An Exemplary System Architecture:

A Road User Vulnerability State Classification and Reporting system and method are provided that enable classification and reporting of Road User Vulnerability States.

FIG. 1 is a schematic illustration of an exemplary network architecture for implementing various embodiments of the disclosure. Referring to FIG. 1, a Vulnerable Road User 105 may be associated with a Road User Device 106. In addition, a Vehicle 107 may be associated with a Vehicle Device 109. The Vehicle 107 may be controlled by a Driver 108 on a roadway 110 near the Vulnerable Road User 105. There may also be a Roadside Unit 104 positioned near the roadway. There may also be a Road Surface Unit 111 positioned upon the roadway surface 110. Each of the Vulnerable Road User Device 105, Vehicle Device 109, Roadside Unit 104 and Road Surface Unit 111 may be configured to communicate with each other over a data network 100 or using direct device-to-device communications. They may each also communicate with a Vulnerability State Server 102 over the data network. The Vulnerability State Server 102 may comprise at least one memory repository having processor-readable instructions and Vulnerability State data stored therein 103, means of data communications and a processor for active network monitoring. Communications may take the form of a Vulnerability State Message that may be stored in memory by at least one of the Vulnerability State Server 102, the Road User Device 106, the Vehicle Device 109, the Roadside Unit 104 and the Road Surface Unit 111. In addition, a Roadway Administration System 101 may be configured to display information related to the Vulnerability State Messages data stored on the Vulnerability State Server 102 to a user such as a Roadway Administrator or a Road User.

Road User Vulnerability State Classification:

In one embodiment, the Road User Vulnerability State Classification and Reporting system and method may be applied to the classification of the Vulnerability State of a Road User or group of Road Users in the context of active traffic on a road network.

Figure 2:
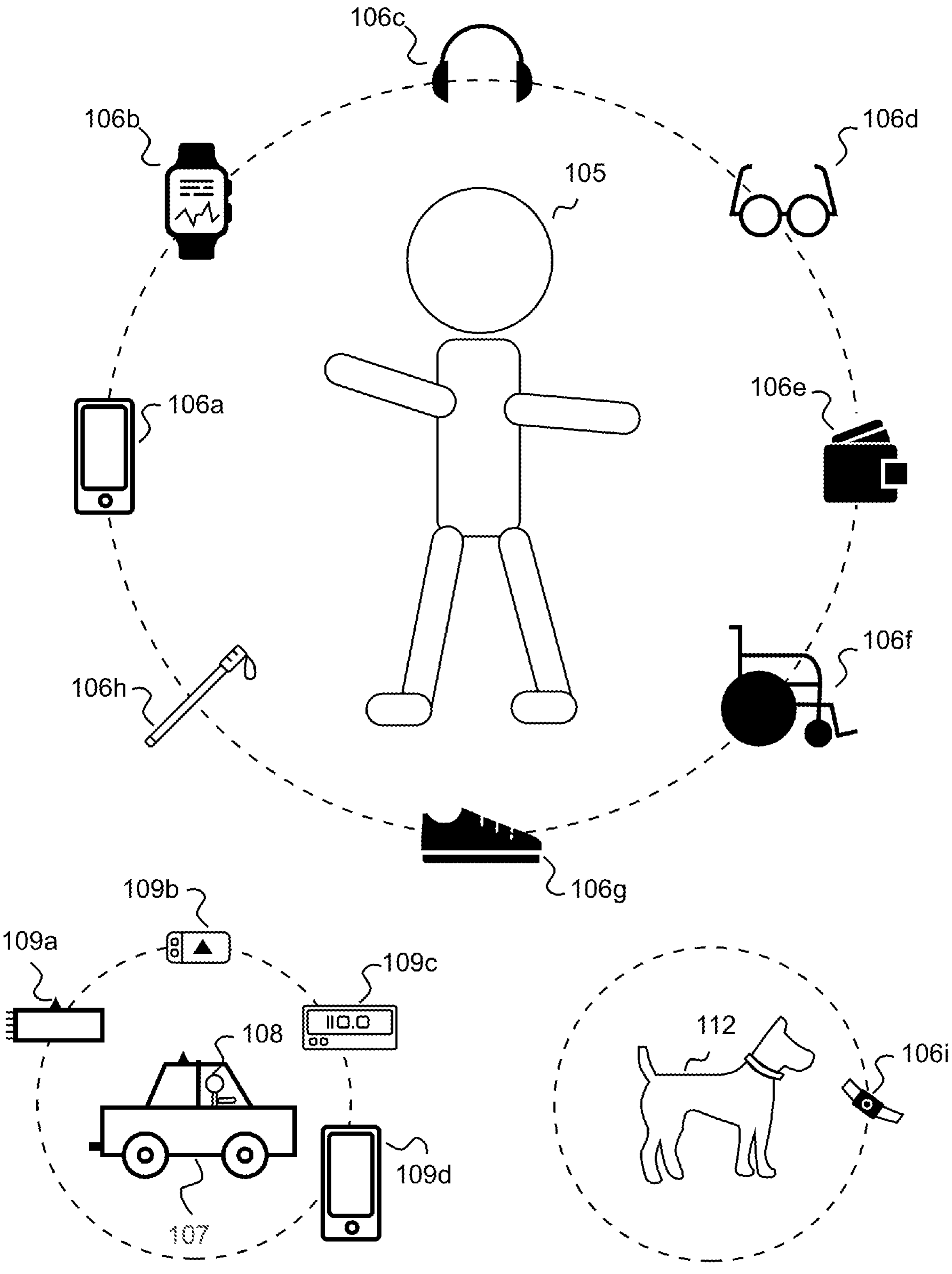
FIG. 2 is a schematic illustration of sample forms of Road User device.

Referring to FIG. 2, the system and method may be capable of classifying the Vulnerability State of different types of Road User, including a human 105, a vehicle 107, or an animal 112. A Road User may be associated with a Road User Device, which could take one of many forms. FIG. 2 includes some exemplary forms of Road User Device that may be associated with a human, including: a smartphone 106*a*, a smartwatch 106*b*, smart headwear or headphones 106*c*, smart eyewear 106*d*, a smart wallet or holder or bag 106*e*, a smart wheelchair 106*f*, smart footwear 106*g*, a smart cane or wand or stick 106*h*, but it may take other forms to be worn, carried, driven, used by, or otherwise associated with the Road User. For example, a human Road User may also engage with a computer system to update or review their Vulnerability State. FIG. 2 also includes some exemplary forms of Road User Device that may be associated with a Vehicle 107, including a plug-in on-board Vehicle Device 109*a*, an embedded on-board Vehicle Device with user interface 109*b* (such as Android Auto, Carplay and similar systems), a taxi meter 109*c*, and a device associated with a driver 108 (or vehicle owner or other occupant) such as a smartphone 109*d*. A Vehicle Device may be associated with another V2X system such as an Advanced Driver Assistance System. FIG. 2 also includes an exemplary form of Road User Device that may be associated with an animal 112—a smart collar or leash 106*i*. A Road User Device may also take other forms.

Figure 3:
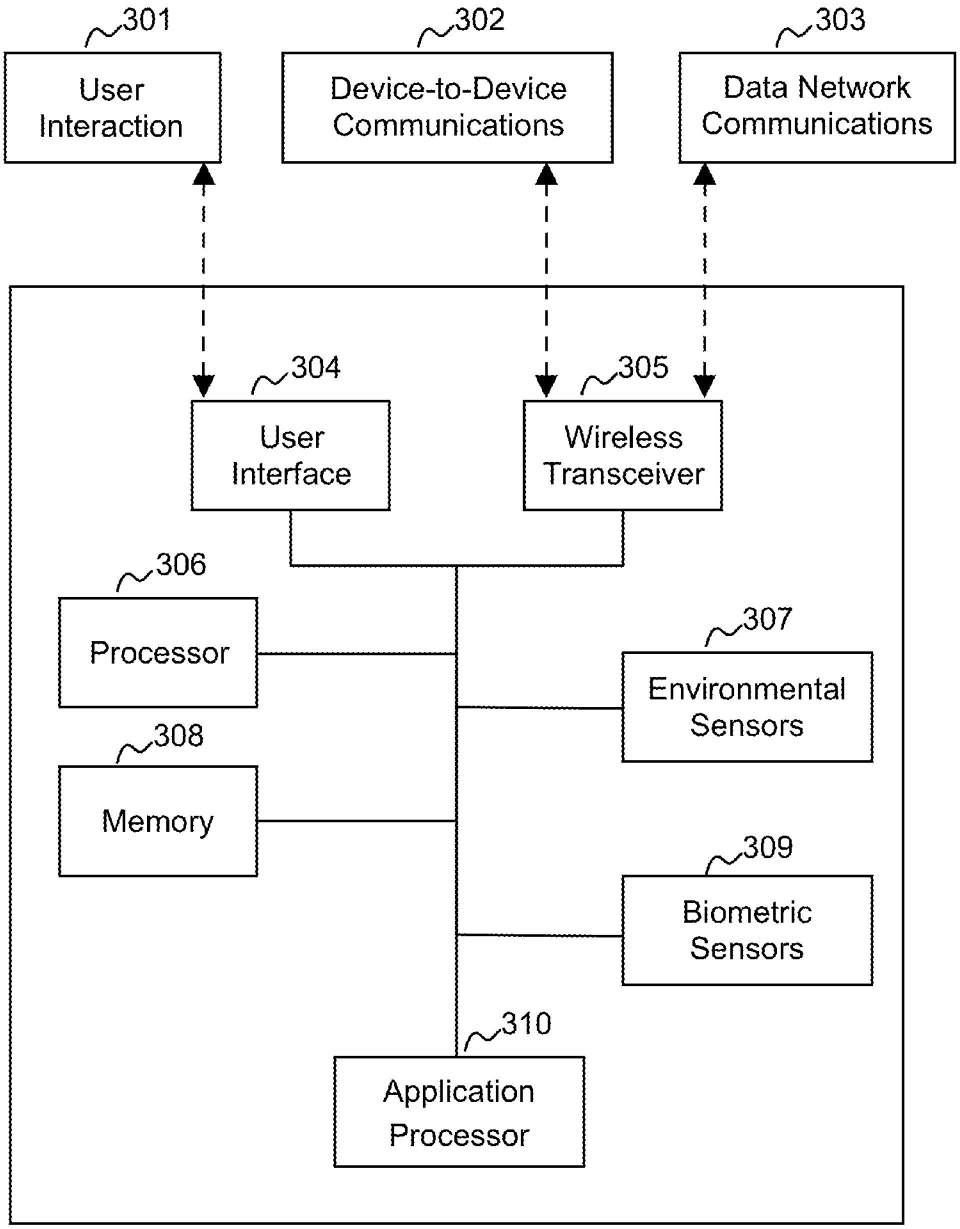
FIG. 3 is a functional block diagram of a Road User Device according to an exemplary embodiment of the disclosure.

Referring to FIG. 3, a Road User Device may include at least one of a user interface 304 for user interaction 301 by the Road User; a wireless transceiver 305 for direct device-to-device communications 302 and data network communications 303; a processor 306 for handling functions such as display, wireless communications and power management; environmental sensors 307 for collecting and measuring data related to environmental factors (e.g. air quality, air constituent parts, moisture, sound, etc.); memory 308 for storing collected data, received Vulnerability State Messages and processor-readable instructions; biometric sensors 309 for collecting and measuring data related to physical or behavioral human characteristics (e.g. alertness, heart rate, blood sugar level, etc.); and an application processor 310 for handling all smart functions related to applications run on the device (e.g. memory management, graphics processing and multimedia decoding), or any combination thereof. The user interface 304 may comprise means for visual, aural or tactile communications, or other forms of communication.

Figure 4:
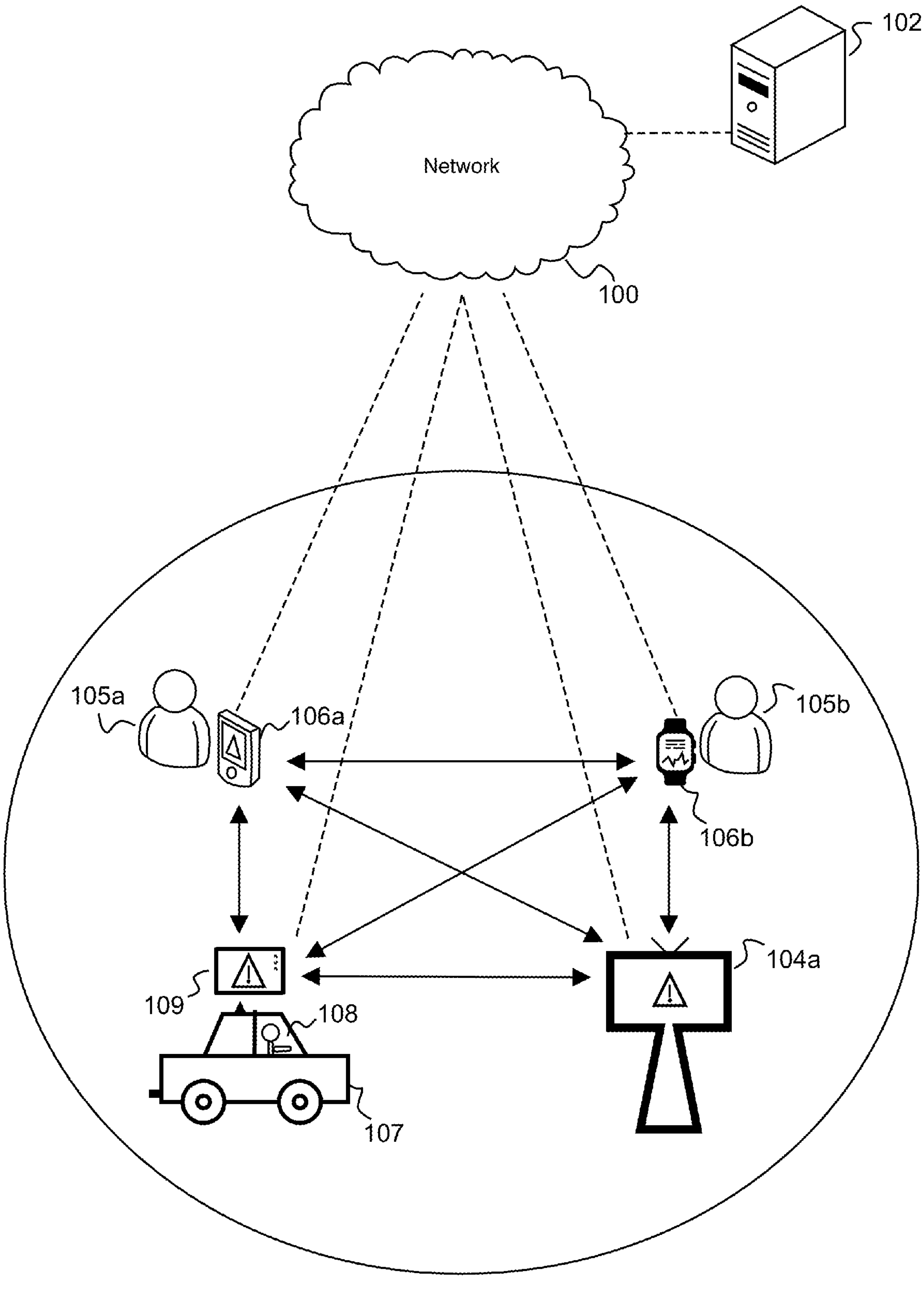
FIG. 4 Is a schematic illustration of an exemplary network architecture for Road User Vulnerability State communications.

Referring to FIG. 4, the system and method of classifying the Vulnerability State of a Road User is founded on data collected and communicated by at least one of a Road User Device (e.g. 106*a*, 106*b*), a Vehicle Device 109, and a Roadside Unit 104. The communication of data related to Vulnerability State may take the form of a Vulnerability State Message. A Vulnerability State Message may be communicated using at least one of a data network, such as the Internet, or direct device-to-device communications. Any device with means of access to data network communications (e.g. via cellular data, WIFI, fixed line, etc.) may send the Vulnerability State Message over the data network 100. In the case of a lack of such access (e.g. momentary break in data network coverage, no cellular data access, etc.), the Vulnerability State Message may be stored in memory (or cache memory) and queued to send later. Any device with means of access to direct device-to-device communications (e.g. Cellular V2X, DSRC, Bluetooth, Bluetooth Low Energy, iBeacon, Eddystone, and other such forms of direct V2X communications, etc.), may send the Vulnerability State Message to other nearby devices, as a unicast (single sender, single receiver), broadcast (single sender, multiple receivers), or multicast (one or more senders, multiple receivers) communication. A Vulnerability State Server 102 may also send, receive, store in memory, collate, and process a Vulnerability State Message. It may also actively monitor network communications throughout the network 100.

For example, a Vulnerable Road User Device 106*a* may communicate a Vulnerability State Message using cellular data over a data network to a nearby Vehicle Device 109. It may also send the same Vulnerability State Message to the nearby Vehicle Device 109 using direct device-to-device communications (e.g. Cellular V2X). The Vehicle Device 109 may have a temporary lack of data network access, and so may only receive the Vulnerability State Message via direct device-to-device communications. The Vehicle Device 109 may respond by sending a Vulnerability State Message back to the Vulnerable Road User Device 106*a*. In this example, the low latency of the direct device-to-device communications method improved the timeliness of the communication. The timeliness of delivery of Vulnerability State Message has a significant impact on its ability to preserve the road safety of a Road User. The timeliness of delivery can be improved further through efficient calculation and communication of Vulnerability States.

Figure 5:
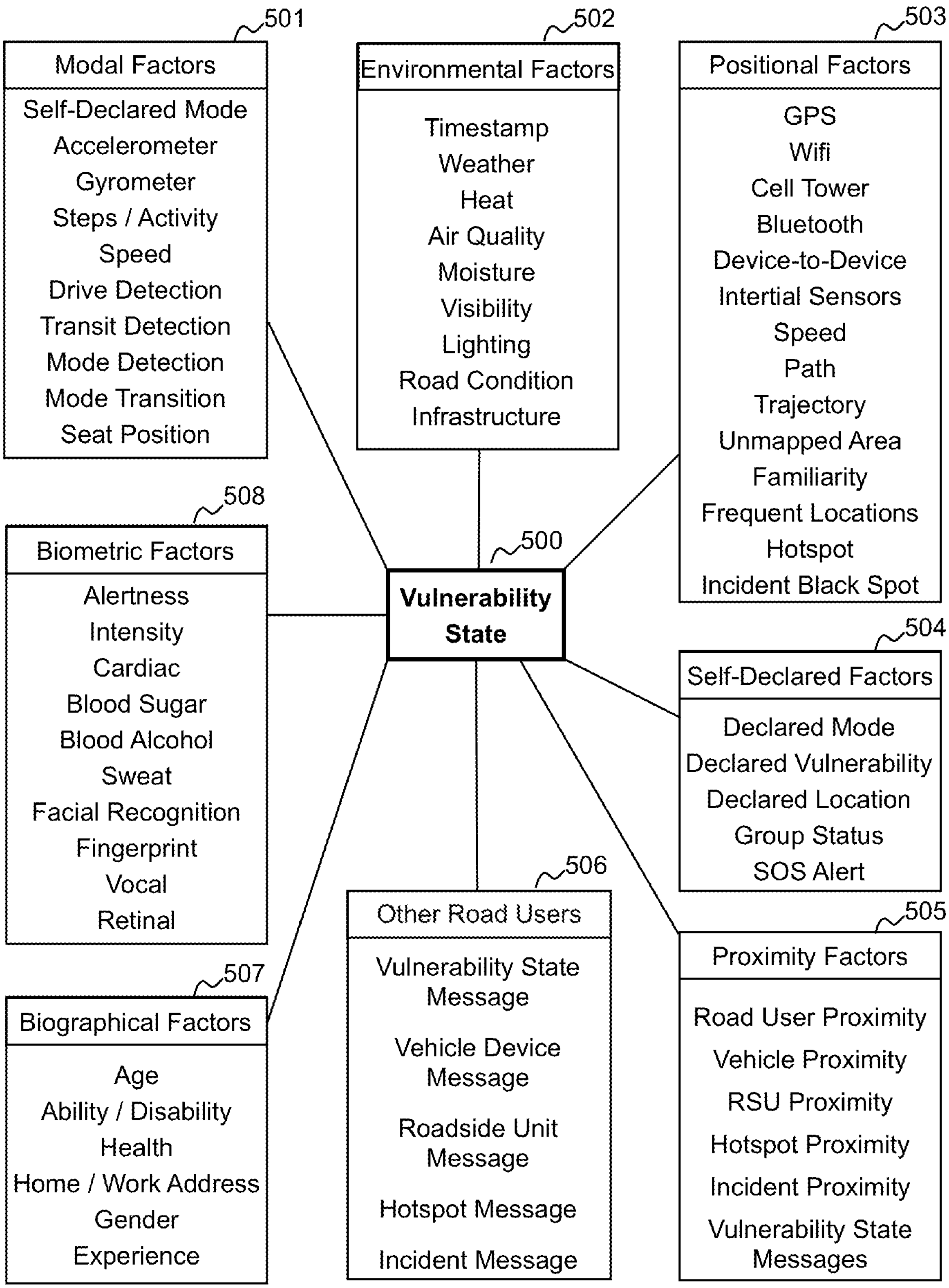
FIG. 5 is a schematic illustration of Vulnerability State Factors that may be referenced in an exemplary classification of Vulnerability State.

Referring to FIG. 5, the classification of Vulnerability State 500 may reference a number of Vulnerability State Factors. These Vulnerability State Factors may be broadly categorized as: Modal Factors 501 associated with data used to determine a Road User's mode of travel; Environmental Factors 502 associated with data used to determine environmental conditions; Positional Factors 503 associated with data for determining the Road User's location, movements, physical surroundings, etc.; Self-Declared Factors 504 associated with data manually declared through a user interface; Proximity Factors 505 associated with data for determining proximity to other known entities and conditions in the connected transportation infrastructure; Other Road User Factors 506 associated with data received from or related to other Road Users; Biographical Factors 507 associated with known personal data; and Biometric Factors 508 associated with data used to determine physical or behavioral human characteristics.

Exemplary Modal Factors 501 may include a self-declared mode status. This may, for example, refer to when a Road User declares their mode of travel using a user interface associated with the Road User Device. For example, a Road User may wish to set their mode of travel to "wheelchair" for times when they travel by wheelchair. Modal Factors 501 may also include data collected by a Road User Device for aiding automated determination of travel mode. These may include: accelerometer data for determining rate of acceleration; gyrometer data for determining orientation and angular velocity; steps or activity data based on a range of inertial motion sensor data; speed data for determining the speed of movement of the Road User Device; drive detection data for determining when a Road User is likely in a vehicle; transit detection data for determining when a Road User is likely on board a transit vehicle, such as a bus or tram or train, etc.; other mode detection data made available by the operating system of the Road User device; mode transition data for determining when a Road User is transition from one mode of travel to another, such as disembarking from a vehicle; seat position for determining a Road User's seated position or pose variation within a vehicle; and other similar mode-related data sources.

Exemplary Environmental Factors 502 may include timestamp data for determining temporal factors that influence Road User safety, including time of day, day of week, time of year, season, etc.; weather data for determining factors that increase Road User vulnerability such as rain, snow, sleet, fog, wind, storms etc.; heat data for determining the temperature of the air, or road surface; air quality data for determining how clean the air is, or its constituent characteristics; moisture data for determining humidity; visibility data for determining how visible the Road User may be; lighting data for determining how well lit the Road User or roadway may be, lack of light, etc.; road condition data for determining how well surfaced or paved the road may be, or how bumpy or dangerous it may be to travel on, or how satisfied Road Users may be with its condition; infrastructure data for determining how well connected the road infrastructure may be, how recently it was maintained or upgraded, how well it is performing, etc.; and other such data that may be useful in determining the Vulnerability State of a Road User, or group of Road Users, or an aggregate Vulnerability State for a geographic area.

Exemplary Positional Factors 503 may include location data such as GPS, WIFI, cell tower and Bluetooth data, and other such sources of data for determining a Road User Device's location or relative location or position within a known environment. It may further include device-to-device data for determining the relative position of a Road User Device with another Road User Device or Roadside Unit.

They may also include inertial sensor data for determining movement or relative movement within a known geographic area or environment. They may also include path and trajectory data for determining the likely path or trajectory of the Road User Device, or the trajectory of a potential collision course. They may also include data related to whether the location of the Road User Device is a known or mapped or unknown environment. They may also include data related to whether the Road User is familiar with the area, has recently been at that location, regularly visits that location ("frequent location"), visits that location as part of a daily commute, is visiting there for the first time or has never visited the area before. They may also include data related to whether the area is currently determined, or has ever been determined, to be a Vulnerability Hotspot Location or a Roadway Incident location or regularly Roadway Incident black spot.

Exemplary Self-Declared Factors 504 may include data related to data input by a Road User in a Road User Device or Roadside Unit. Sometimes a Road User may wish to override any automated classification of their travel mode, location or Vulnerability State. A user may wish to increase or decrease their Vulnerability State classification for a number of reasons. For example, before crossing a busy intersection, a pedestrian may wish to increase their Vulnerability State so that other Road Users nearby, including Vehicles, may have an increased awareness of their relative vulnerability. As a further example, a Road User may wish to increase their Vulnerability State so that a nearby Roadside Unit may respond in a way that preserves their road safety, such as increasing pedestrian crossing times or decreasing pedestrian crossing wait times. A Road User may also wish to adjust their Vulnerability State classification so that Roadway Administrators can better understand where Road Users feel most vulnerable. In the context of automated vehicles traveling on the roads, a Road User may even wish to declare their identity as a group of Road Users to increase the likelihood that an autonomous vehicle's collision avoidance logic will more likely preserve their road safety. A Road User may optionally increase their Vulnerability State to an SOS threshold amount that may be used to automatically alert others (including emergency services, nearby Road Users, or any medical professionals who may be nearby) that they need assistance.

Exemplary Proximity Factors 505 may include data related to the relative proximity of a Road User Device, Vehicle Device, or group of such devices. They may also include data related to the proximity of a Roadside Unit, a location known to be (or previously known to be) a Vulnerability Hotspot Location or Roadway Incident location. They may also include Vulnerability State Messages received from nearby Road User Devices or Roadside Units. They may also include data related to the proximity of other known objects, or places, or categories of place, etc.

Exemplary Other Road Users 506 data may include Vulnerability State Messages received from other Road User Devices, including Vehicle Devices, as well as from Roadside Units. They may also include Vulnerability State Messages received from the Vulnerability State Server, including those related to a Vulnerability Hotspot Location or Roadway Incident. In each of these cases, the data included in the Vulnerability State Message may be helpful in determining a situational awareness of Road User vulnerability in the area, which may in turn impact the Road User's own Vulnerability State.

Exemplary Biographical Factors 507 data may include personal characteristics of a Road User including their age, level of ability/disability, health, home or work address, gender and experience with the system and method for Road User Vulnerability State Classification and Reporting, as well as other similar biographical factors that may be ascertained when the Road User manually inputs or updates the details, or collected automatically, or inferred automatically, or from other sources.

Exemplary Biometric Factors 508 data may include alertness data for determining how alert the Road User is; intensity data for determining whether a Road User's movement is indicative of high or low intensity; cardiac data, such as ECG, EMG or EEG data, for determining factors such as stress, heart rate, heart rate variability, fatigue, heart age, breathing index, mood, etc.; blood sugar data for measuring blood sugar levels; blood alcohol data for measuring blood alcohol concentration; sweat data for determining levels of sweat; facial recognition data for determining unique facial features and personal identity; fingerprint data for determining unique fingerprint characteristics and personal identity; vocal data for determining input data as well as unique voice characteristics, mood, stress and personal identity; and retinal data for determining unique retinal characteristics and personal identity; as well as other biometric data that may be available.

These are just some exemplary Vulnerability State Factors that may be used in isolation, or in combination, as part of a Vulnerability State classification method. Such a classification method may reference at least one such Vulnerability State Factor, and it may dynamically adjust according to which data factors are available or known or updated.

The above exemplary Vulnerability State Factors may be associated with a Road User or their associated Road User Device. However, they may also be associated with a group of such Road Users, or for determining a Vulnerability Hotspot Location or a Roadway Incident. They may also be associated with a Roadside Unit for improved situational awareness and roadside Road User vulnerability reporting.

The above Exemplary Vulnerability State Factors may be collected by at least one of a Road User Device, including a Vehicle Device; a Roadside Unit and the Vulnerability State Server. They may be collected continuously, periodically, on a timed basis, occasionally, upon an event, upon receipt of a Vulnerability State Message, or at other times. Data associated with a specific Vulnerability State Factor may be collected or updated on its own, or in combination with at least one other Vulnerability State Factor.

Figure 6:
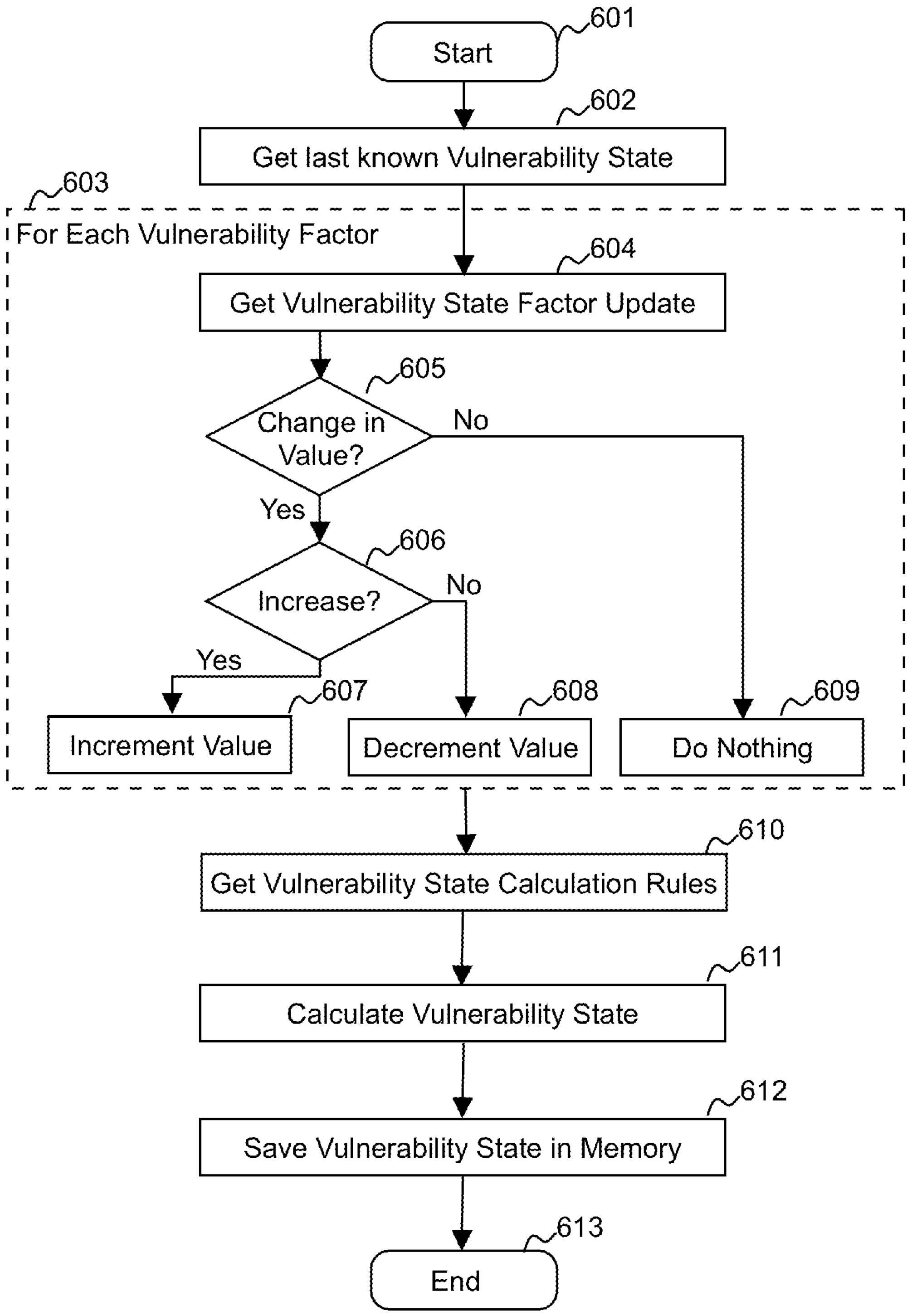
FIG. 6 Is a flow diagram of an exemplary method of classification of Vulnerability State.

Referring to FIG. 6, the method of Road User Vulnerability State classification may comprise getting the last known Vulnerability State for a Road User 602; for each Vulnerability State Factor in a set of Vulnerability State Factors 603, getting updated Vulnerability State Factor data 604, determining whether any change has occurred in the Vulnerability State Factor 605, adjusting a Vulnerability State Factor value upon confirming the change as an increment 607 or decrement 608 or doing nothing upon a lack of such confirmation 609; referencing Vulnerability State calculation rules from memory 610; calculating the Road User's Vulnerability State 611 in accordance with the Vulnerability State calculation rules; and saving the calculated Vulnerability State in memory 612.

Alternatively, the method may comprise getting the Vulnerability State Calculation Rules at the start of the process, or prior to checking for updates in Vulnerability State Factors.

The method of Vulnerability State Classification results in a Vulnerability State being saved in memory 612. This saved Vulnerability State may comprise at least one of a number of different Vulnerability State summary values, e.g. a number, a percentage value, a score, a value category, a value tier, or other such summary values. Each Vulnerability State Factor value may comprise at least one similar summary value. At different times, it may be advantageous to communicate Vulnerability State as a simple summary value, or as a more detailed summary and set of Vulnerability State data, or as a full set of Vulnerability State data.

The Vulnerability State calculation rules may comprise at least one algorithm, scoring approach, weighted scoring approach, decision tree, or other such rule set that defines the steps for determining a Vulnerability State classification. The calculation rules may differ for Road Users, groups of Road Users, geographic areas, types of Road User, Road User Devices, Vulnerability Hotspot Locations, Roadway Incidents, Roadside Units, different times of day, different days of the week, and other different time periods, etc. A Vulnerability State may also differ between a general Vulnerability State and a relative Vulnerability State. For example, a pedestrian Road User may have a low general Vulnerability State but a high relative Vulnerability State in relation to a vehicle Road User passing nearby, or relative to a group of other Road Users, etc.

The Vulnerability State calculation rules may be updated manually by a Roadway Administrator using a user interface associated with a Roadway Administration System; or automatically upon syncing within the calculation rules stored at the Vulnerability State Server; or automatically according to machine learning or deep learning or artificial intelligence or upon changes detected in patterns of Road User Vulnerability States for a given geographic area; upon event occurrences; and other external factors.

The method of Road User Vulnerability State classification may be executed by at least one of the Road User Device, the Vulnerability State Server and the Roadside Unit. It may be implemented continuously, periodically, upon at least one time interval, occasionally, randomly, upon an event; upon receipt of a Vulnerability State Message, upon a change being detected in at least one Vulnerability State Factor; upon a change being detected in the Vulnerability State of any other Road User, group of Road Users, Roadside Unit; and at other such times.

In an exemplary embodiment of the system and method for Vulnerability State Classification, the Road User Device may initiate the method upon a time interval. The application processor may reference its last known Vulnerability State value, as saved in memory. It may then cycle through each Vulnerability State Factor in a set of Vulnerability State Factors stored in memory to check for any changes in each Vulnerability State Factor value. Upon confirming an increase in vulnerability associated with at least one Vulnerability State Factor, it may reference the Vulnerability State calculation rules and calculate the Road User's current Vulnerability State before saving the Vulnerability State classification in memory. In this example, the Vulnerability State calculation rules may comprise a weighted scoring algorithm that assigns more weight to at least one Environmental Factor at different times of day. For example, a calculation of Vulnerability State for a pedestrian Road User crossing at a busy intersection with poor lighting conditions and poor road condition will assign more weight to environmental factors such as time-of-day, season, and adverse weather conditions.

In another example, the calculation of Vulnerability State may comprise assigning greater weight to Environmental Factors if Positional Factors such as Familiarity, or GPS, or Frequent Locations history, indicate that the Road User is in an unfamiliar location.

In another example, the method of classification of Vulnerability State may be triggered upon receipt of a Vulnerability State Message associated with a Vulnerability Hotspot Location. Upon confirmation that the Road User Device is within a geographic vicinity of the Vulnerability Hotspot Location, the calculation rules may adjust to assign greater weight to Proximity Factors such as proximity to the Vulnerability Hotspot Location.

In another example, the method of classification of Vulnerability State may assign greater weight to particular Vulnerability State Factors such as Modal Factors. For example, a Road User traveling in a wheelchair, or with a blind person's assistance cane, may be assigned an elevated Vulnerability State in the context of an active traffic scenario such as a busy intersection.

In yet another example, the method of classification of Vulnerability State may assign different calculation rules according to the type of Road User, such as a vehicle Road User, an animal Road User, or a human Road User. A vehicle Road User, including one operating in autonomous mode, may have Vulnerability State calculation rules applied with decreased sensitivity to Biometric Factors but increased sensitivity to Environmental Factors. An animal Road User may have the calculation rules applied with decreased sensitivity to Self-Declared Factors but increased sensitivity to Positional Factors. And a human Road User may have the calculation rules applied with increased sensitivity to Biometric Factors and Biographical Factors.

In this way, the rules for the calculation of Vulnerability State may dynamically update in response to a specific situation. They may adjust according to a determination of threshold values for at least one Vulnerability State Factor. A Vulnerability State calculation rule hierarchy may apply to assist in efficiently applying the appropriate Vulnerability State.

In another example, the method of Vulnerability State classification may include the ability for a Road User to set their Vulnerability State using a user interface associated with a Road User Device. By manually setting their Vulnerability State, the Road User may be able to make nearby Road Users, including vehicles, more aware of their position and status as a Vulnerable Road User. For example, a Road User may wish to declare that they are feeling highly vulnerable, or that they are traveling as a cyclist or as a wheelchair user. This may afford the Road User greater security and improved road safety by alerting the connected infrastructure, including nearby Road Users, to their presence. Without any automated or manual classification of Vulnerability State, the Road User's safety depends on the ability of a Vehicle Device or a driver to visually discern and classify their presence as an object that should not be collided with.

In another example, the method of classification of Vulnerability State may be initiated by a Roadside Unit. The method may be triggered, for example, upon receipt of at least one Vulnerability State Message; or data received through at least one of a user interface and environmental sensor. A benefit of the method of classification of Vulnerability State being initiated at the Roadside Unit is that it may be a more responsive approach in the case of poor cellular data network coverage. The Roadside Unit may receive at least one Vulnerability State Message from direct device-to-device communications with nearby Road User Devices, including Vehicle Devices, or it may sense a sudden change in weather conditions. In this way, the Roadside Unit may classify a geographic area within its near proximity as a Vulnerability Hotspot even at times when data network communications are unavailable, e.g. during a violent storm. The Roadside Unit may similarly be capable of applying a Vulnerability Hotspot classification based on a threshold Vulnerability State value for at least one Road User or apply a specific Roadway Incident state upon detection of Vulnerability States likely associated with a Roadway Incident event, such as a traffic bottleneck or collision.

An advantage of storing Vulnerability State updates in memory is that it enables analysis of previous Vulnerability States for the purposes of: detecting changes in Vulnerability State; understanding Vulnerability State for a particular period of time; for collating Vulnerability States for at least two Road Users; for Road User Vulnerability State classification and reporting; for comparing Vulnerability State over particular time periods, including for different Road Users, for particular geographic areas, for different geographic areas, and for other such purposes.

Road User Vulnerability State Communication:

In another embodiment, the Road User Vulnerability State Classification and Reporting system and method may be applied to Road User Vulnerability State Communication.

The means for reporting on Vulnerability State may comprise a Vulnerability State Message.

A Vulnerability State Message may be communicated via at least one of the Road User Device, the Roadside Unit, and the Vulnerability State Server and to at least one of a Road User Device, a Roadside Unit, a Vulnerability State Server and an Administration System Device. The communication of the Vulnerability State Message may be configured to initiate based on a determination that the Road User's Vulnerability State has changed beyond a predetermined threshold (e.g. indicating a high Vulnerability State), or periodically upon on a timed interval, or continuously, or occasionally, or randomly, or upon receipt of a Vulnerability State Message, or upon other determinations or combination of such determinations, or at other such times.

Figure 7:
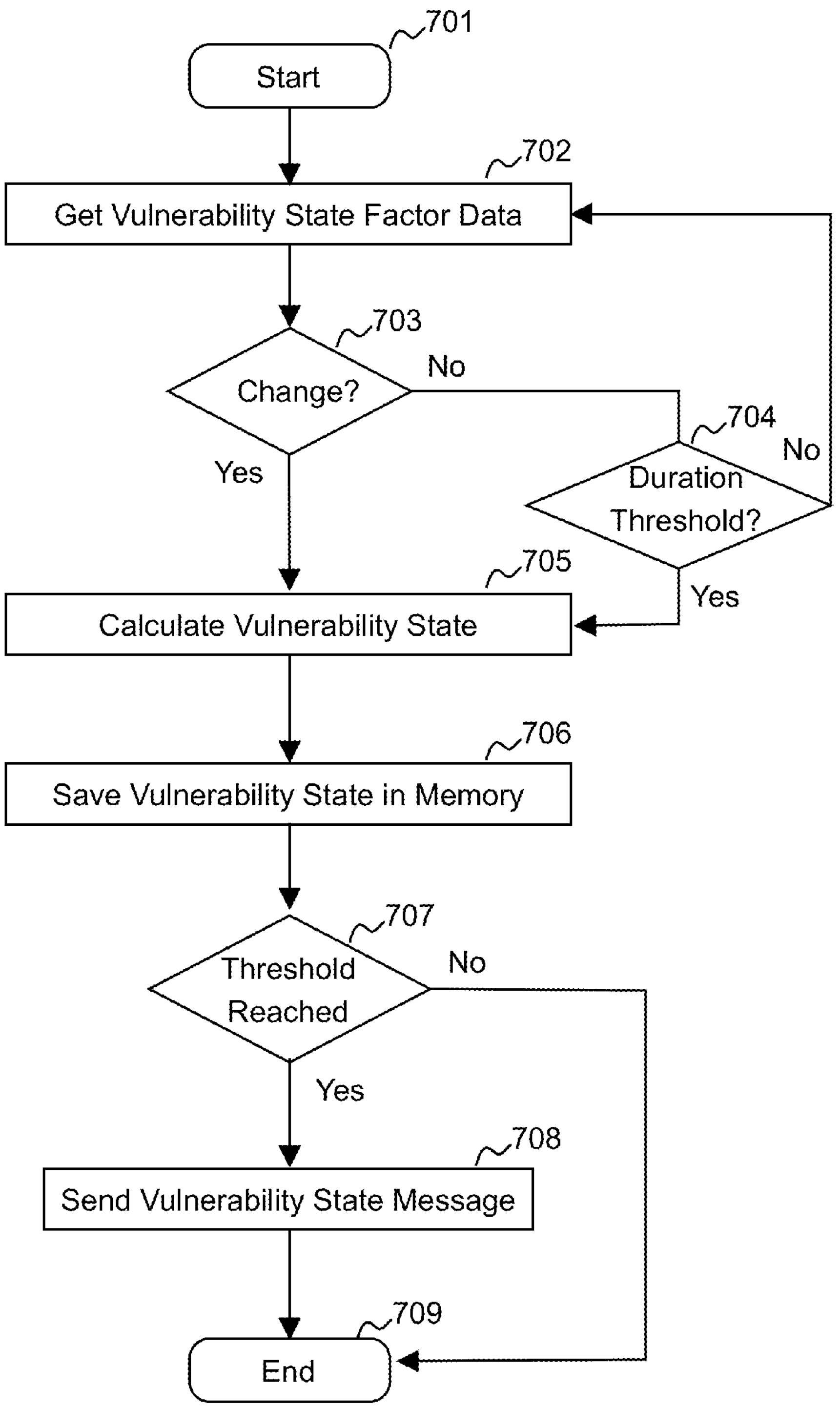
FIG. 7 Is a flow diagram of an exemplary method for communicating Vulnerability State as a Vulnerability State Message.

Referring to FIG. 7, an exemplary method of communicating Vulnerability State as a Vulnerability State Message may comprise: getting updated data for at least one Vulnerability State Factor 702; determining whether at least one Vulnerability State Factor has changed since Vulnerability State was last calculated 703; proceeding to calculate Vulnerability State 705 according to Vulnerability State calculation rules if a change was confirmed or upon a time threshold being reached 704; calculating Vulnerability State 705; saving the calculated Vulnerability State in Memory 706; and communicating the Vulnerability State as a Vulnerability State Message 708 upon confirmation that Vulnerability State has changed to a new threshold amount 707.

Figure 8:
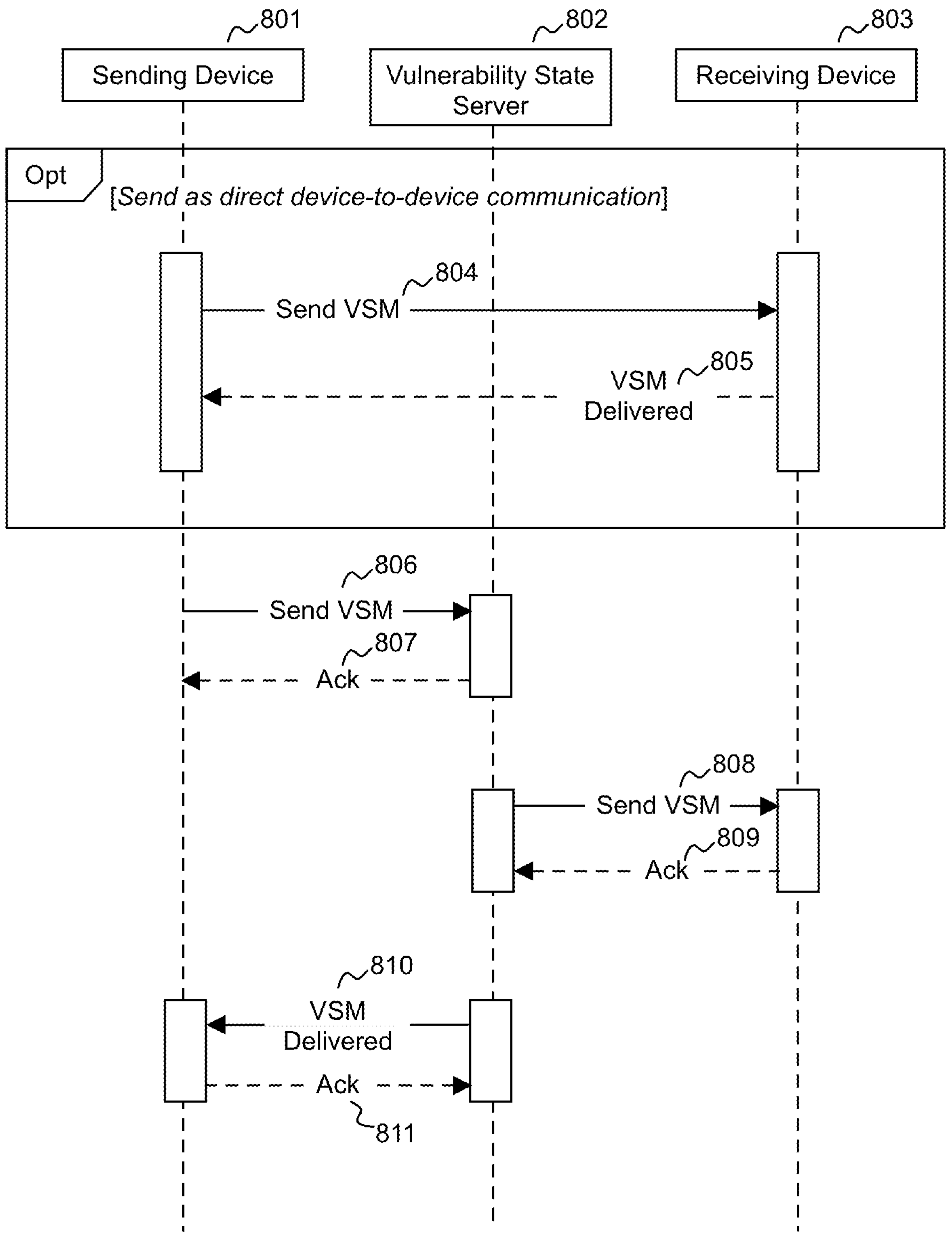
FIG. 8. is a sequence diagram of an exemplary method for communicating Vulnerability State as a Vulnerability State Message.

Referring to FIG. 8, the method of communicating Vulnerability State as a Vulnerability State Message may further comprise sending a delivery acknowledgement 805 in response to a sent Vulnerability State Message 805 being successfully communicated from the sending device 801 and to the receiving device 803. This may be implemented to enable the system to determine whether it should try re-sending the Vulnerability State Message or routing it through other means, or passing through other devices. When sending a Vulnerability State Message over the data network, it may be routed first via 806 the Vulnerability State Server 802, which may also send back an acknowledge of the delivery 807, prior to sending the Vulnerability State Message to the target receiving device 808, which may in return send an acknowledgement back 809 to the Vulnerability State Server 802. The Vulnerability State Server 802 may then send a message delivery communication back 810 to the sending device 801, which may in return send a communication acknowledging receipt 811.

When a Vulnerability State Message is received by a Road User Device, it may be communicated to the Road User through a number of forms, including visual display associated with a user interface (e.g. as text, graphics, motion graphics, infographics, video, etc.), tactile feedback (e.g. kinesthetic vibration, force feedback, air vortex rings, ultrasound beams), aural communications (beeping, alert sound, music, vocal output, aural aid, etc.), or combinations of any such forms, or other communications means.

Figure 15:
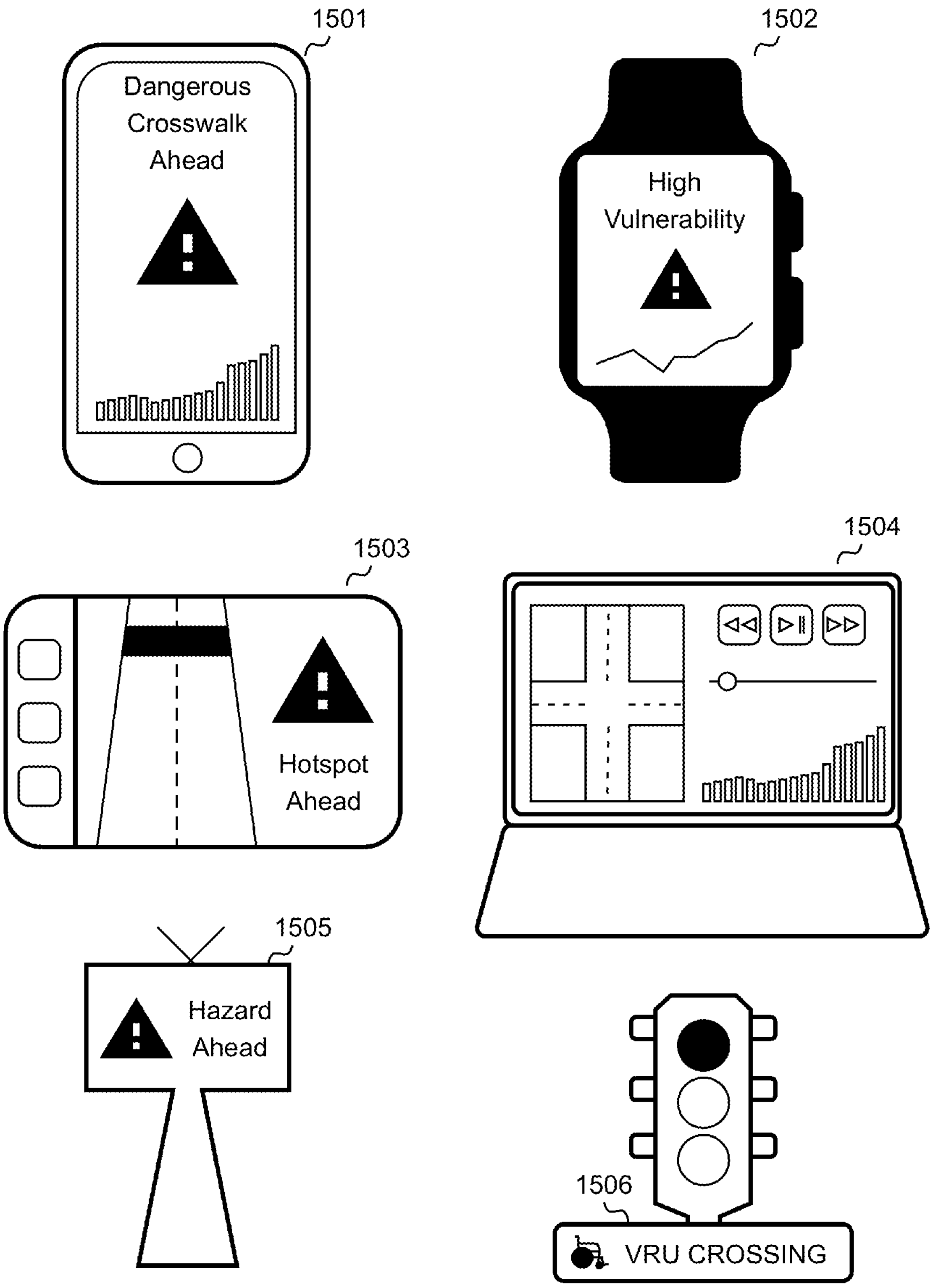
FIG. 15 is a schematic illustration of visual communications of Vulnerability State Messages according to exemplary embodiments of the disclosure.

Referring to FIG. 15, some exemplary forms of communications to a Road User are illustrated, including: displaying visual feedback to a Road User, including historical Vulnerability State data on a user interface associated with a Road User device such as a smartphone 1501; displaying an alert message on another user interface associated with a Road User Device such as a wearable device like a smartwatch 1502; displaying Vulnerability State Message data on a Vehicle Device 1503; displaying Vulnerability State Message data on a user interface associated with a Roadway Administration System 1504; displaying Vulnerability State Message data on a visual display associated with a Roadside Unit 1505 such as a variable messaging sign; and displaying Vulnerability State Message data on a visual display associated with another Roadside Unit, such as a traffic signal 1506.

A Vulnerability State Message may relate to a Personal Vulnerability State Message, an Inter-Road User Vulnerability State Message, a Vulnerability Hotspot Location Vulnerability State Message, a Roadway Incident Black Box Vulnerability State Message, and other similar categories of Vulnerability State Message.

A Personal Vulnerability State Message includes data related to the personal Vulnerability State of an individual Road User. The objective of the Personal Vulnerability State Message is to provide the Road User with feedback about their own Vulnerability State, thereby enabling them to make better and early decisions that protect their personal road safety. The Personal Vulnerability State Message may take the form of a personal alert when their Vulnerability State reaches a threshold amount. However, more frequent, or regular, or continuous, reports on Vulnerability State enable the Road User to anticipate dangerous scenarios in advance of them occurring. For example, the Road User may be able to inspect their current or last confirmed Vulnerability State on their Road User Device as a summary score (e.g. "90"), or text (e.g. "high"), or an infographic (e.g. red warning icon), or as route guidance, or navigation or map interface, or other graphical presentations. They may also be able to receive Vulnerability State through audio communications means, or through tactile feedback, or through other communications means. Historical Vulnerability State data may also be displayed graphically (e.g. as a chart or through tabular presentation), enabling the Road User to understand trends in their Vulnerability State, including Vulnerability State comparative analyses of historical personal data, Vulnerability States of other Road Users, for different geographic areas etc. Over time, as additional Vulnerability State data is collected for a Road User, it is possible to provide an improved presentation of a Road User's Vulnerability State at a particular location, or along a particular path; and to predict or forecast their Vulnerability State at a future time and place. For example, after a few weeks of Vulnerability State data being collected for a Road User along their regular commute path, it is possible to display to the Road User on a Road User Device an accurate presentation of their Vulnerability State along the commute path, highlighting areas at which they tend to be most vulnerable.

An Inter-Road User Vulnerability State Message relates to the communication of a Vulnerability State Message from a Road User Device to at least one Road User Device. An Inter-Road User Vulnerability State Message improves road safety by making the presence of Vulnerable Road Users known to nearby Road Users, who must otherwise visually identify nearby objects with which they should not collide. It makes the identification of Road Users more efficient and predictable throughout the connected transportation infrastructure. The communication of the Vulnerability State Message may be by direct device-to-device communications means or over a data network such as the Internet. The objective of the Inter-Road User Vulnerability State Message is to provide the receiving Road User Device with data that may be useful in determining their own Vulnerability State, the relative Vulnerability State between the two Road User Devices, and the general situational context within a shared geographic area. The Inter-Road User Vulnerability State Message may take the form of an alert informing the Road User to increase their road safety awareness. It may trigger the Road User device to provide visual, tactile or aural communications to the Road User. However, in another example, it may provide data that does not need to be communicated to the Road User but is helpful in Vulnerability State classification, such as data that may be used in the background to determine the likelihood of a collision trajectory. The receiving Road User Device may also respond with an acknowledgment or with a Vulnerability State Message. In this way, regular, continuous or periodic Vulnerability State Messages between at least two Road User Devices enable an improved coordinated understanding of their relative Vulnerability States, including their relative position, movement and trajectories. This may be configured to happen in the background, without any communication to the Road User.

A Vulnerability State Message may also relate to the communication of a Vulnerability Hotspot Location. The objective of this Vulnerability State Message is to provide Road Users with information related to a determined Vulnerability Hotspot Location, for example alerting Road Users that they are approaching an area with an unusually elevated road safety risk associated with a road hazard, or high concentration of Vulnerable Road Users, etc. When such a Vulnerability State Message is received by a Road User Device, including by a Vehicle Device, the Road User's Vulnerability State may be increased, and an alert may be issued to the Road User using means for visual, tactile or aural communications. When such a Vulnerability State Message is received by a Roadside Unit, the Roadside Unit may also be configured to communicate an alert to nearby Road Users using visual, tactile, aural or physical automation means. When such a message is received by the Vulnerability State Server, the Vulnerability State Server may be configured to identify and relay the communication to Road Users and Roadside Units within a geographic proximity to the Vulnerability Hotspot location.

A Vulnerability State Message may also take the form of a Roadway Incident Black Box Vulnerability State Message. The objective of the Black Box Vulnerability State Message is to communicate a set of collated Vulnerability State data relevant to a particular context, such as data associated with a particular Road User or Group of Road Users for a particular time period or recurring time period; or collated data related to a particular Vulnerability Hotspot (including a Roadway Incident); or collated data for a particular geographic area, or time period. For example, a Roadway Administration System may be configured to receive a Black Box Vulnerability State Message and present it in a graphical report it to a Roadway Administrator on a user interface associated with the Roadway Administration System for the purposes of better understanding road safety at a particular geographic area, or the causes of a particular Vulnerability Hotspot, or determining causation for a particular Roadway Incident, etc.

The complexity of a V2X ecosystem means that there is often a lot of data to communicate, process and store, and so it may be advantageous to minimize data communications to critical data communications. In recent years, this has led to the rise of data orchestration through abstracting data across systems, virtualizing all the data, and presenting the data via standardized APIs with global namespace to data-driven applications.

To improve the efficiency of communications, the system and method of Road User Vulnerability State Communication may apply data orchestration rules or logic for the timing and content of a Vulnerability State Message. Minimizing the data that needs to be communicated may also have the advantage of reducing latency in communications, enabling Vulnerability State Message to arrive more quickly, which has a positive impact on road safety.

Therefore, the content of a Vulnerability State Message may be minimized for improved efficiency and timeliness of delivery. For example, the Vulnerability State Message may be configured to include only a simple Vulnerability State summary value (e.g. score, or binary state, or category state or other short value), or a subset of Vulnerability State data (e.g. data related to a limited number of Vulnerability State Factors), or a full set of Vulnerability State (e.g. all data related to each Vulnerability State Factor.

In addition, the timing of when to trigger the communication of the Vulnerability State Message may be immediate; or queued for sending on a timed basis, or periodic timed basis, or upon determination of a threshold Vulnerability State value, or upon receipt of a Vulnerability State Message, or upon reconnection to a data network or type of data network, or at other times, or a combination of such factors.

For example, the system and method may be configured to synchronize Vulnerability States between the Vulnerability State Server and at least one of the Road User Device (including a Vehicle Device) and a Roadside Unit. Such synchronization may involve sending a Vulnerability State Message with a complete set of data, or sending a subset of such data related to recently updated factors. For example, a Road User Device may send a synchronization Vulnerability State Message to the Vulnerability State Server periodically on a timed interval, or upon a change being determined in Vulnerability State, or upon reconnection to a data network or particular type of data network, or according to other such times.

Figure 18:
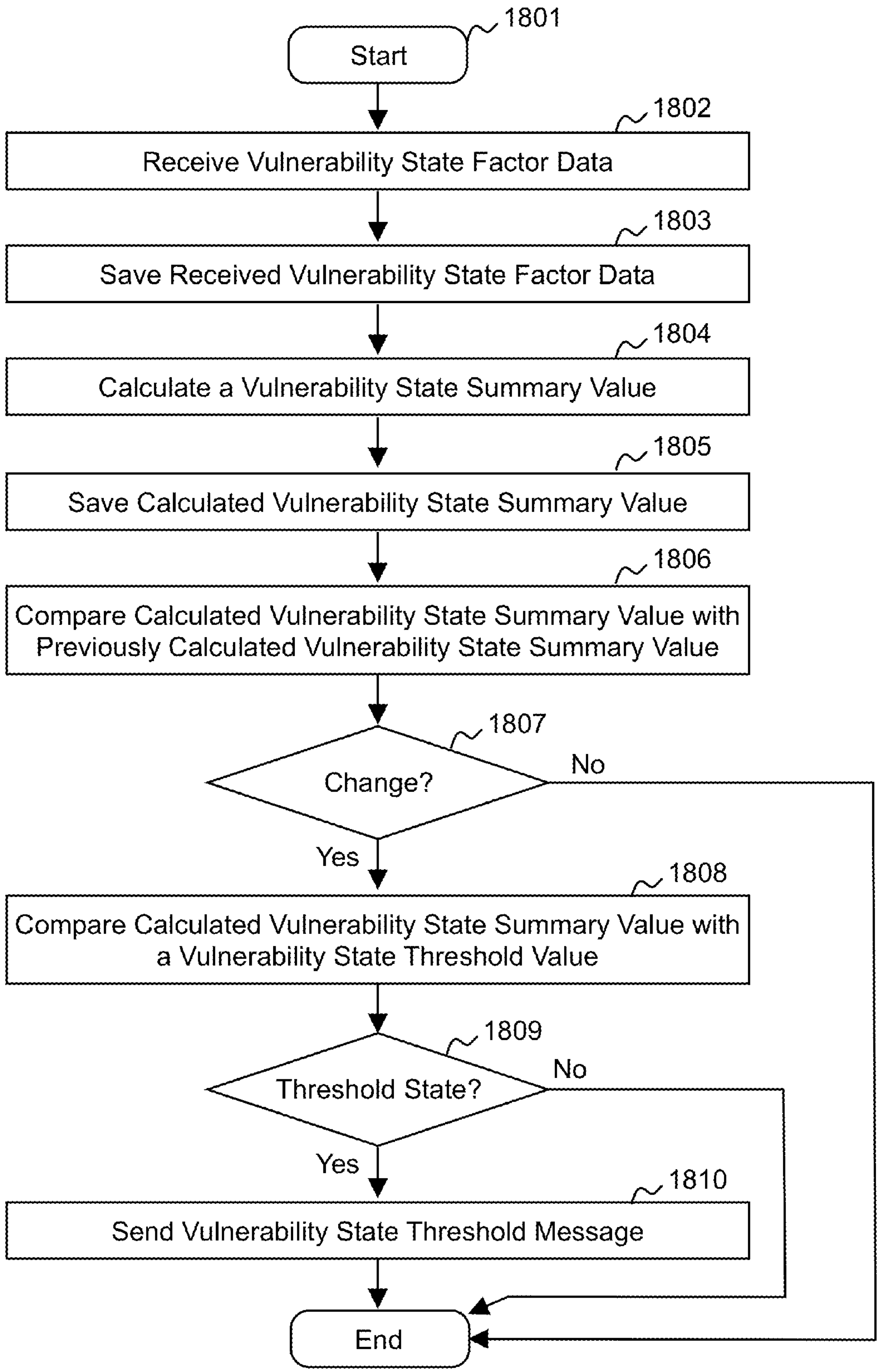
FIG. 18 is a flow diagram of an exemplary method for communicating a Vulnerability State Threshold Message when a Road User's vulnerability state exceeds a threshold value.

As another example, the method of communicating a Vulnerability State Message may be initiated upon determining that a Vulnerability State summary value has increased or decreased beyond at least one Vulnerability State threshold value. Referring to FIG. 18, this method of communicating a Vulnerability State Threshold Message may comprise receiving Vulnerability State data associated with at least one Vulnerability State Factor 1802; saving the received Vulnerability State in a memory repository 1803; calculating a Vulnerability State summary value 1804; saving the calculated Vulnerability State summary value in a memory repository 1805; comparing the calculated Vulnerability State summary value with a previously calculated Vulnerability State summary value 1806; identifying a difference in the compared Vulnerability State summary values 1807; comparing the calculated Vulnerability State summary value with at least one Vulnerability State threshold value 1808; identifying that the calculated Vulnerability State summary value has reached at least one Vulnerability State threshold 1809; and sending a Vulnerability State Threshold Message 1810. The method of communicating a Vulnerability State Threshold may be initiated by at least one of a Road User Device, Roadside Unit and a Vulnerability State Server.

As another example, a Vulnerability State Server may send a Vulnerability State Message to a Road User device as an Application Programming Interface (API) request. In this case, Vulnerability State may be communicated according to a set data format associated with a Vulnerability State Message. This has the advantage of enabling custom applications to be developed by different software developers for different device types, while maintaining a standard format for Vulnerability State communications in a separate layer. The Road User Device, upon authenticating the API request, may respond with a summary of its current Road User Vulnerability State comprising a summary value and a minority subset of Vulnerability State Factors data that have changed since its last communication to the Vulnerability State Server. As the majority of Vulnerability State factors data did not change since its last known communication of Vulnerability State to the server, this data is excluded from the Vulnerability State Message it sends in response, thereby minimizing data communications and improving the timeliness of communications.

As another example, it may be advantageous to send an initial Vulnerability State Message with a larger volume of data related to a full set of Vulnerability State Factors, or subset of the factors, and then communicate at least one follow-up Vulnerability State Message with a smaller volume of data related to a change in one of the previously shared factors. A pedestrian Road User Device may communicate an initial Vulnerability State Message with a full set of Vulnerability State Factors to an approaching Vehicle Device. It may then follow-up with a series of Vulnerability State Messages comprising only updates to a subset of Vulnerability State Factors, such as Positional Factors. Once the initial handshake communication has taken place and the Vehicle Device is aware of the Road User's Vulnerability State, it can then focus on updates to the most useful or the most transient factors such as its relative position. In this way, Vulnerability State may be communicated far more efficiently than through sensor-based visioning and object detection technologies.

Sometimes, particularly when a Road User Device has limited access to a data network, it may be advantageous to pass-through a Vulnerability State Message via at least one other device such as a Roadside Unit or another Road User Device. For example, a Roadside Unit may be aware of a Roadway Incident nearby and attempt to communicate an elevated Vulnerability State for its geographic area to nearby Road User Devices as a Vulnerability State Message. However, if one of those Road User devices does not have access to a data network and is out of range of direct device-to-device communications with the Roadside Unit, the Vulnerability State Message may be passed-through or routed through another Road User Device that is within device-to-device communications range with the out-of-reach Roadside Unit. In a similar manner, a Vulnerability State Message may be passed through from a Vehicle Device at the front of a bottleneck all the way back through traffic to a Vehicle Device at the back of the bottleneck. In another example, a Vulnerability State Message may be sent by the Vulnerability State Server and passed through a Road User Device on its way to a Roadside Unit that has a temporary data network connectivity fault.

Figure 11:
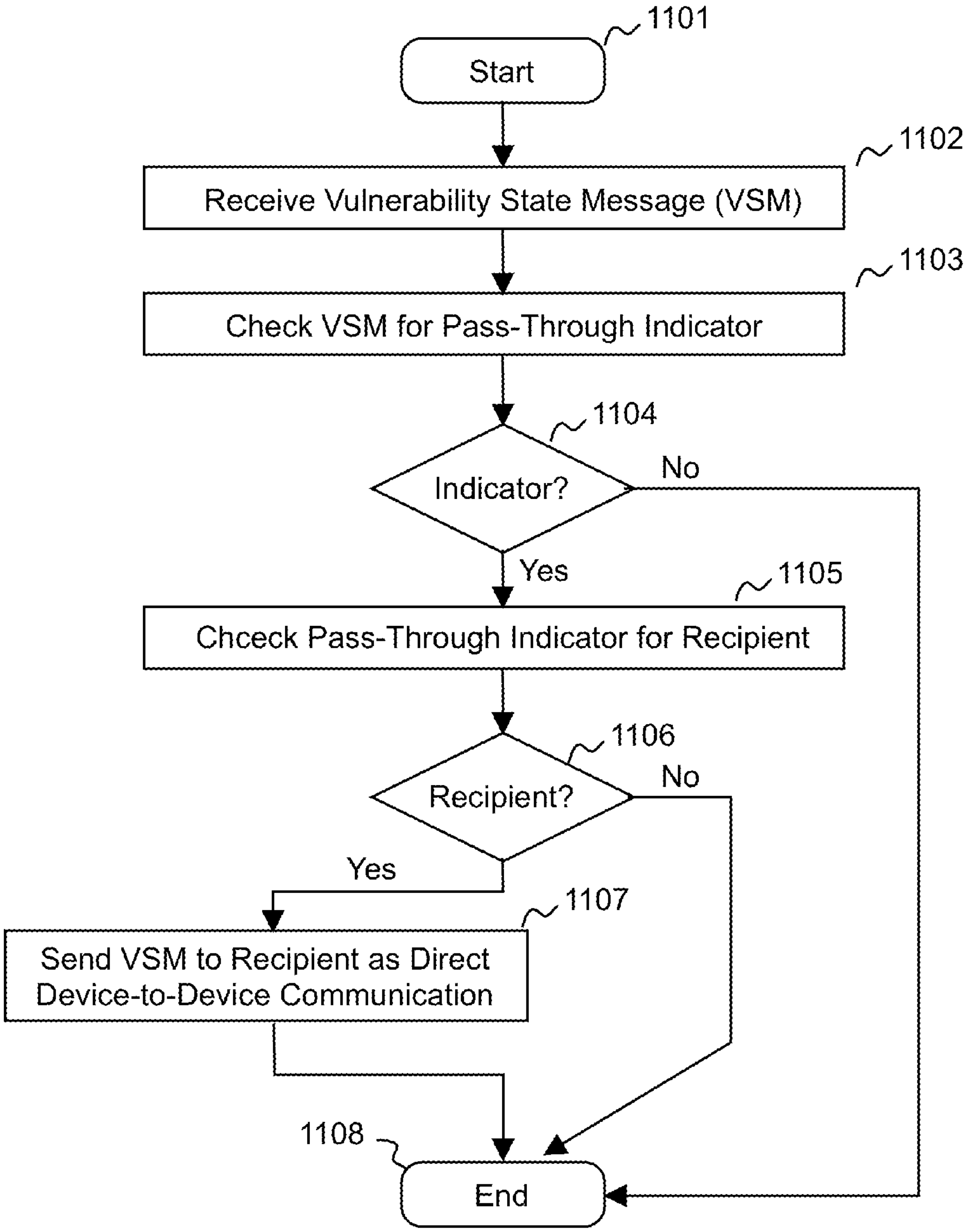
FIG. 11 is a flow diagram of an exemplary method for Vulnerability State Message pass-through communication.

Referring to FIG. 11, the method of communicating Vulnerability State may comprise passing through a Vulnerability State Message by: receiving a Vulnerability State Message 1102; identifying a pass-through recipient 1105 upon checking 1103 and confirming 1104 that the Vulnerability State Message includes a pass-through indicator; confirming that the receiving entity is not the target recipient of the Vulnerability State Message 1106; and communicating the Vulnerability State Message to the target recipient as a direct device-to-device communication 1107 upon confirming that the receiving entity is not the target recipient 1106. If the receiving entity is not within direct device-to-device communications range of the target recipient, it may re-route the Vulnerability State Message as another pass-through communication via at least one other device within device-to-device communications range.

Vulnerability Hotspot Location Reporting:

In another embodiment, the Road User Vulnerability State Classification and Reporting system and method may be applied to identifying and reporting Vulnerability Hotspot Locations.

It may be advantageous to collate and analyze Vulnerability State data from at least two Road User Devices, or at least two time periods, or at least two locations, or combinations of those approaches.

For example, Vulnerability State data from multiple Road Users within the same geographic threshold at approximately the same time may be useful in determining a Vulnerability Hotspot Location, i.e. a location at which there is an elevated Vulnerability State indicative of an increased likelihood of a road safety incident such as a collision.

A Vulnerability Hotspot location may be determined when a threshold aggregate Vulnerability State has been reached for a geographic location (or for a group of users within the geographic location), potentially indicating the presence of a group of highly Vulnerable Road Users, or the presence of a particular Roadway Incident, such as a traffic bottleneck, or the presence of a roadway hazard, or the presence of an infrastructure fault, or a collision. This information may then be used to warn nearby and approaching Road Users to be particularly careful or to avoid the area. For example, a Vulnerability State Message may be sent by the Vulnerability State Server to a Roadside Unit to update a visual display that warns approaching Road Users.

Figure 9:
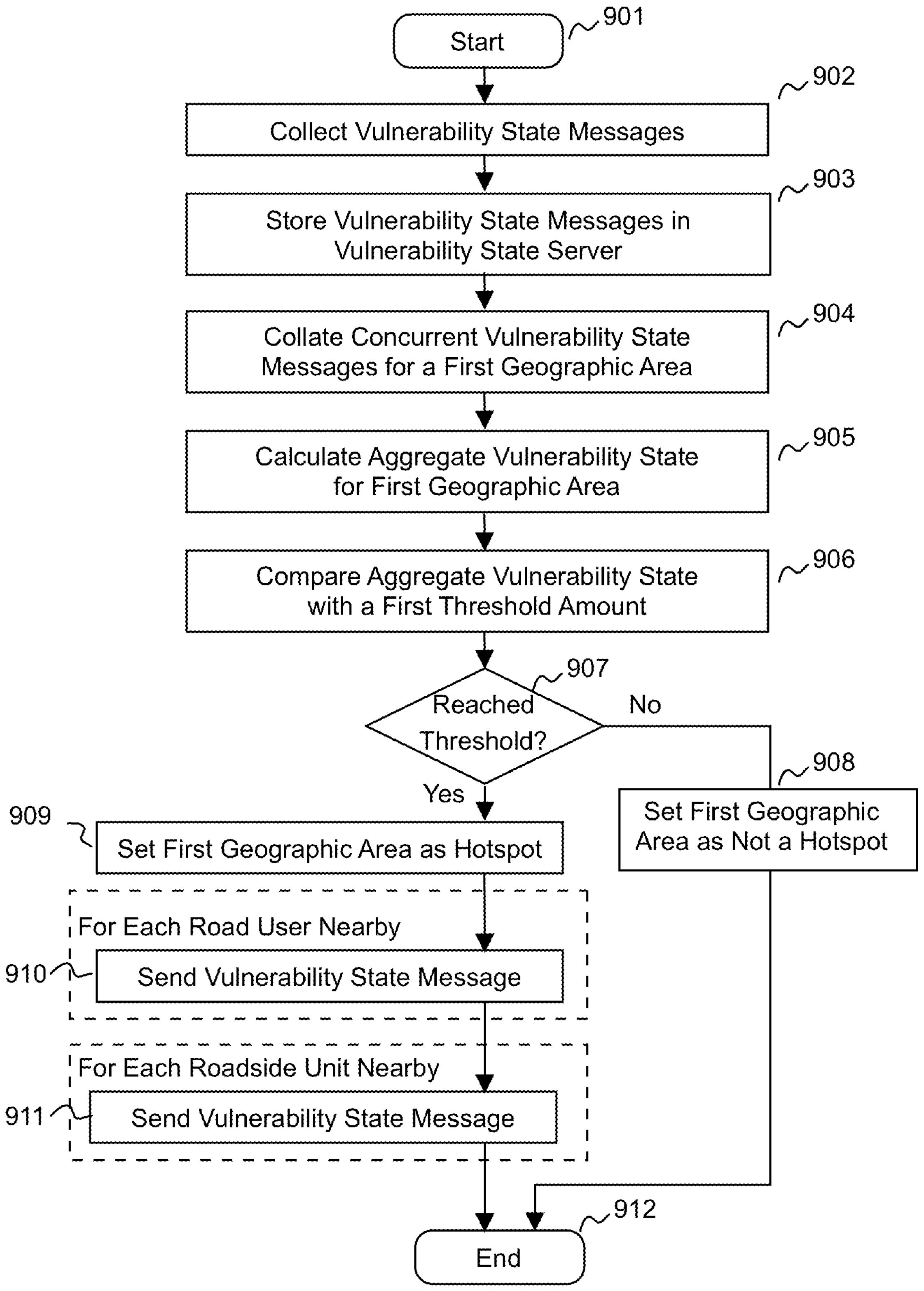
FIG. 9 is a flow diagram of an exemplary method for identifying and reporting a Vulnerability Hotspot Location.

Referring to FIG. 9, the method of reporting a Vulnerability Hotspot Location may comprise collecting Vulnerability State Message from at least one of a Road User Device or a Roadside Unit 902; saving those Vulnerability State Messages in memory 903; collating Vulnerability State Messages associated with Road Users or Roadside Units within the same geographic area at approximately the same time 904; calculating an aggregate Vulnerability State for the geographic area 905; comparing the calculated aggregate Vulnerability State for the geographic area with at least one threshold value 906; setting the first geographic area as a Vulnerability Hotspot 909 upon confirming that a threshold Vulnerability State was reached 907; and sending a Vulnerability State Message to each Road User and Roadside Unit nearby (such as within the first geographic area, or within a second geographic area).

A Vulnerability Hotspot Location may also be manually set by a Roadway Administrator using a user interface associated with an Administration System.

The threshold value for determining a Vulnerability Hotspot Location may differ according to different geographic areas; the number of Road Users or Roadside Units within the geographic area; the time period associated with the Vulnerability State; the time of year, or day; a particular category of Roadway Incident; particularly Vulnerability State factors; a Vulnerability Hotspot calculation rule set saved in memory; a Roadway Incident calculation rule set saved in memory; a manual adjustment made through a user interface associated with a Roadway Administration system; an automated adjustment made by the Server based upon machine learning or artificial intelligence, or through other means.

Figure 12:
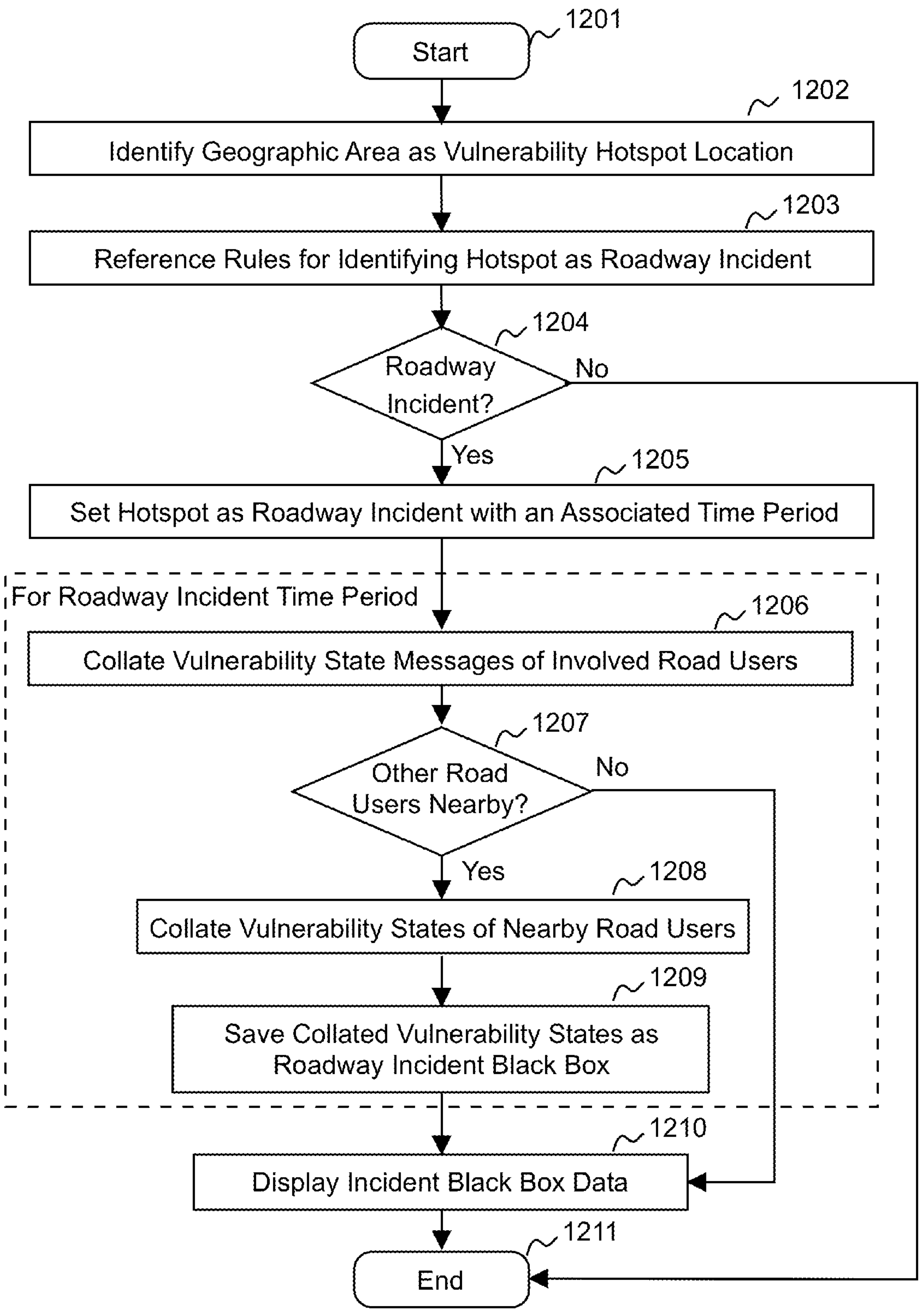
FIG. 12 is a flow diagram of an exemplary method for Roadway Incident Black Box reporting.

Referring to FIG. 12, data associated with a particularly Vulnerability Hotspot Location further defined as a particular Roadway Incident may be saved, collated and made available for analysis as Black Box evidence data by: identifying a geographic area as a Vulnerability Hotspot Location 1202; referencing rules saved in memory for identifying a Vulnerability Hotspot Location as a particular Roadway Incident 1203; determining if the Vulnerability Hotspot is associated with a particular Roadway Incident 1204; setting the Vulnerability Hotspot as a particular Roadway Incident for a particular time period 1205; for the time period associated with the Roadway Incident, collating Vulnerability State Messages of Road Users likely involved in the Roadway Incident 1206, collating the Vulnerability Sate Message of any other nearby Road Users 1208 determined as within close proximity 1207 to the Roadway Incident, saving the collated Vulnerability State Messages in memory as a Roadway Incident Black Box 1209; and presenting the Roadway Incident Black Box data as evidence associated with the Roadway Incident 1210.

The rules for identifying a Vulnerability Hotspot Location as a particular Roadway Incident may, for example, comprise algorithms or logic for identifying sudden, unexpected, or gradual changes in the Vulnerability State of at least one Road User. The rules may differ according to the type of Roadway Incident. For example, a collision may be identified by particular Vulnerability State Factors associated with the Vulnerability State of at least two Road Users within close proximity and followed by a gradual change in the Vulnerability State of other nearby Road Users. It may be advantageous to automatically notify emergency service personnel if a collision Roadway Incident is identified as a collision to a threshold degree of certainty, or if Vulnerability State Factors, including biometric factors, associated with at least one Road User indicate that medical professionals may be required.

In another example, a gradual clustering of Road Users may be associated with a particular Roadway Incident such as a buildup of traffic as part of a traffic bottleneck. Particular Vulnerability State factors may be referenced as part of this identification, including positional factors associated with a lack of movement, biometric factors associated with stress or frustration, and other such factors.

In another example, a Roadway Incident may be identified upon determination of a road hazard such as a fault in the connected transportation infrastructure, or hazardous movement associated with an inebriated person, or an out of control animal.

The method of determination of a Vulnerability Hotspot Location may also include reference to historical data. For example, the use of big data analysis, machine learning or artificial intelligence may enable patterns or trends to be identified in Vulnerability State data. Upon identifying a trend, such as the regular occurrence of Vulnerability Hotspots or Roadway Incidents at the same geographic area on Monday mornings, the system and method may automatically anticipate the determination of a Vulnerability Hotspot Location and accordingly pre-set the geographic area as a Vulnerability Hotspot Location in advance. This may be advantageous in preventing potential Road Incidents from occurring by alerting Road Users or adjusting traffic rules in advance of a potential Roadway Incident.

By referencing historical Vulnerability State Data for an individual it's possible that the Road User may be associated with certain locations where their Vulnerability State is higher than others. Therefore, the system and method may be configured in such a way that each Road User may have a different set of Vulnerability Hotspot Locations. For example, if a Road User always crosses a busy intersection at the end of a two-hour commute, they may be more vulnerable at that location than someone who travels at the same busy intersection at the start of their journey. The Road User Device may be configured to provide aural guidance or haptic feedback or other communications to the Road Users as they approach their personal Vulnerability Hotspot Location.

It may also be advantageous to apply individual traffic rules to particular Road Users. For example, a Road User with a history of driving too quickly or ignoring traffic signals, may be assigned a stricter set of traffic rules such as a lower speed limit. Or their travel may be restricted to particular times of day to protect the most vulnerable Road Users.

By referencing current or historical data to identify locations at which Road User vulnerability may be elevated, the system may also be configured to provide a Road User with personal route guidance or navigation that enables them to avoid those areas. For example, a pedestrian Road User may check a user interface associated with a Road User Device such as a smartphone to determine the safest route to travel. This may be based on real-time data associated with other Road Users, real-time data associated with a Vulnerability Hotspot Location, real-time data associated with a Roadside Unit, or based on the Road User's own historical Vulnerability State data. By providing the pedestrian Road User with those insights, they may be able to adjust their travel path or route in a way that optimizes their road safety. Such safe passage route guidance or navigation may involve audio guidance while someone is traveling, or map-based guidance, or text-based guidance, or other such forms of navigation guidance.

The method of identifying and reporting a Vulnerability Hotspot Location may be configured to remove or end the Vulnerability Hotspot state upon determining that the Vulnerability State of the geographic area has reached a threshold value 706 associated with not being a Vulnerability Hotspot. A Vulnerability Hotspot state may also revert to not being a Vulnerability Hotspot upon expiration of a time period, or upon manual adjustment by a Roadway Administrator using a user interface associated with a Roadway Administration System.

The determination that a Vulnerability Hotspot Location exists or has stopped existing may result in an adjustment of traffic rules, such as speed limit rules, lane access rules, traffic signal rules, parking rules, etc.

The coordinated presence and movement of more than one Vulnerable Road User may result in an increased Vulnerability State being determined for a geographic area associated with the cluster of Road Users. For example, a cluster of Vulnerable Road Users, such as school children walking together, may be afforded increased priority in the connected infrastructure to preserve their road safety. In this way, a Road User Cluster may result in the identification of a Roving Vulnerability Hotspot that is dynamically associated with their coordination geographic movement. A Roving Vulnerability Hotspot could, for example, result in a Pedestrian Green Wave with coordinated or cascading traffic signal prioritization for the Road User Cluster; or a dynamically reduced speed limit associated within a geographic proximity threshold of their location; or other traffic rule adjustments that favor the road safety of the Road User Cluster.

It may, therefore, be advantageous for at least one Road User to wish to form or join a cluster or Roving Vulnerability Hotspot. A Road User Device user interface may be configured to enable a Road User to discover, or search for, or avoid, or create a new Road User Cluster for others to find. A Road User Device may also be configured to display nearby Road User clusters; or to adapt routing or navigation guidance to enable the Road User to join or avoid the cluster; or to otherwise communicate the presence of a nearby Road User Cluster.

Similarly, it may be desirable to present to a Road User a scheduled Road User Cluster or Roving Vulnerability Hotspot that is automatically formed along a particular route at a particular time. This would allow a Road User to adapt their travel plans to the scheduled timing to avail of preferential Road User treatment in the connected infrastructure. Alternatively, a Roadway Administrator may update the Roadway Administration System to generate a Road User Cluster or Roving Vulnerability Hotspot along a geographic path at a set time. This would allow, for example, cyclist Road Users to anticipate the safest time to commute.

It may also be desirable to present an estimate of when a Road User Cluster will form, or a frequency at which Road User Clusters are likely to form. This estimate could be based on historical data associated with patterns of Roving Vulnerability Hotspots.

It may also be desirable to apply a Road User Cluster state to a particular Road User or group of Road Users. For example, a Roadway Administrator may wish to grant road safety privileges associated with a Road User Cluster to a particular vehicle, such as a school bus, to better preserve their road safety. A user interface associated with the Roadway Administration System may be configured to enable the Roadway Administrator to grant these road safety privileges to a particular Road User, or group of Road Users, for a particular geographic area or path, for a particular time period or recurring time period, etc.

Roadside Vulnerability State Reporting:

In another embodiment, the Road User Vulnerability State Classification and Reporting system and method may be applied to Roadside Vulnerability Reporting.

The system and method of Roadside Vulnerability Reporting may be capable of communicating Vulnerability State data to Road Users through a Roadside Unit.

Figure 13:
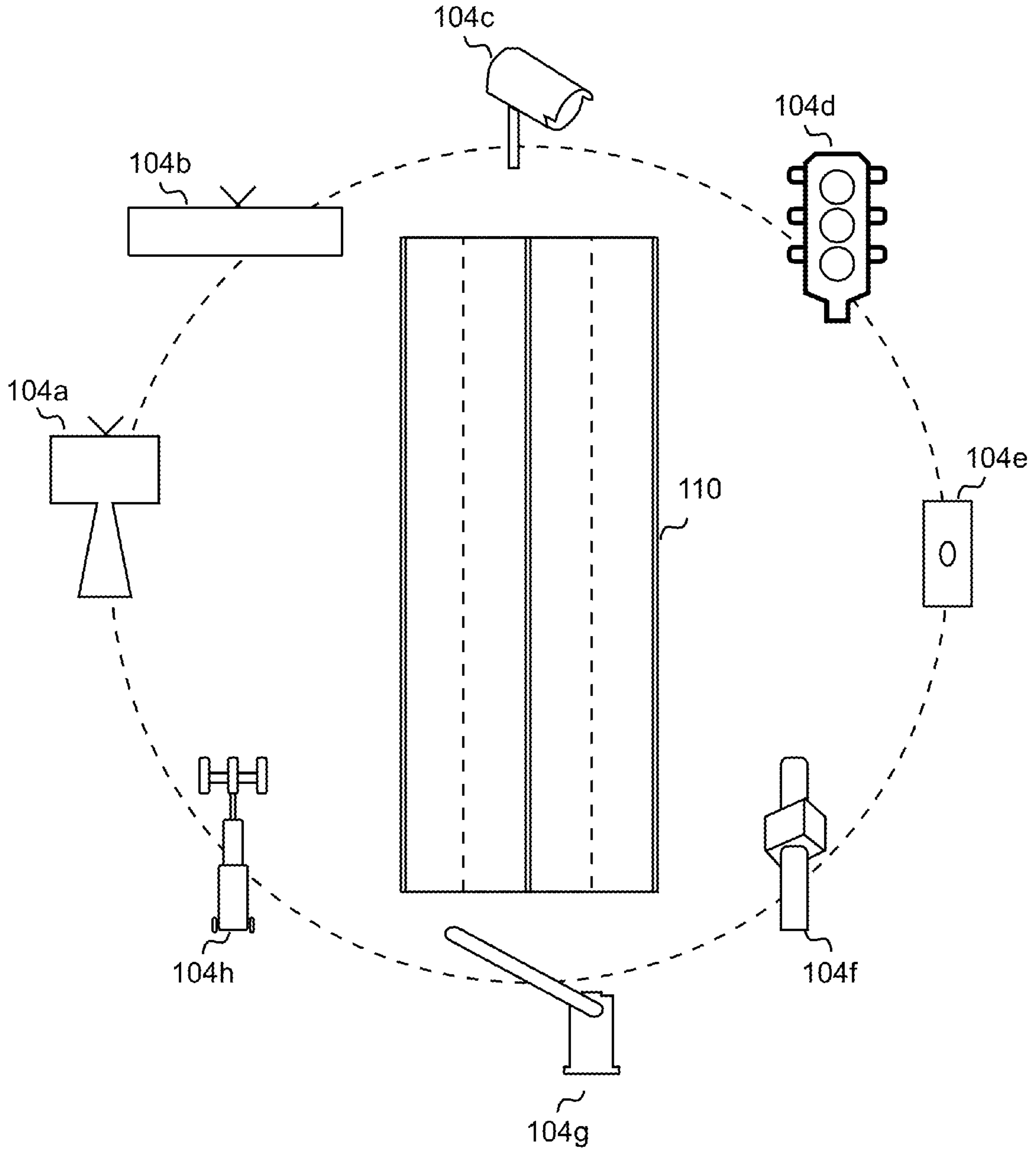
FIG. 13 is a schematic illustration of forms of Roadside Unit according to exemplary embodiments of the disclosure.

Referring to FIG. 13, the system and method of Roadside Vulnerability Reporting may comprise at least one of different types of Roadside Unit, including: a Variable Messaging Sign 104*a*, configured to visually display information (such as text, graphics, infographics, flashing lights, changing colors, etc.) to nearby Road Users; a Road Surface Unit 104*b* such as a throughput counter or beacon for counting passing Road Users or measuring their speed, volume, weight or classification, or other such measurements; a Roadside Imaging System 104*c* for identifying, recording, or classifying a passing Road User; a Roadside Traffic Signal Unit 104*d* for communicating traffic rules as signals to nearby Road Users; a Road Signal Unit 104*e* such as a road stud (e.g. cats eye), or lane divider, or bollard, or speed bump for signaling path guidance or warnings to nearby Road Users; a Mounted Roadside Unit 104*f* such as a pole-mounted Roadside Unit, or a Roadside Unit affixed to another surface; a Road Barrier 104*g* for granting entry to a particular lane or roadway or entrance; a Communications Roadside Unit 104*h* for enhancing communications signal strength; and other forms of Roadside Unit.

The Roadside Unit may be positioned at a fixed location or it may be a mobile Roadside Unit that can move or be moved between locations.

Figure 14:
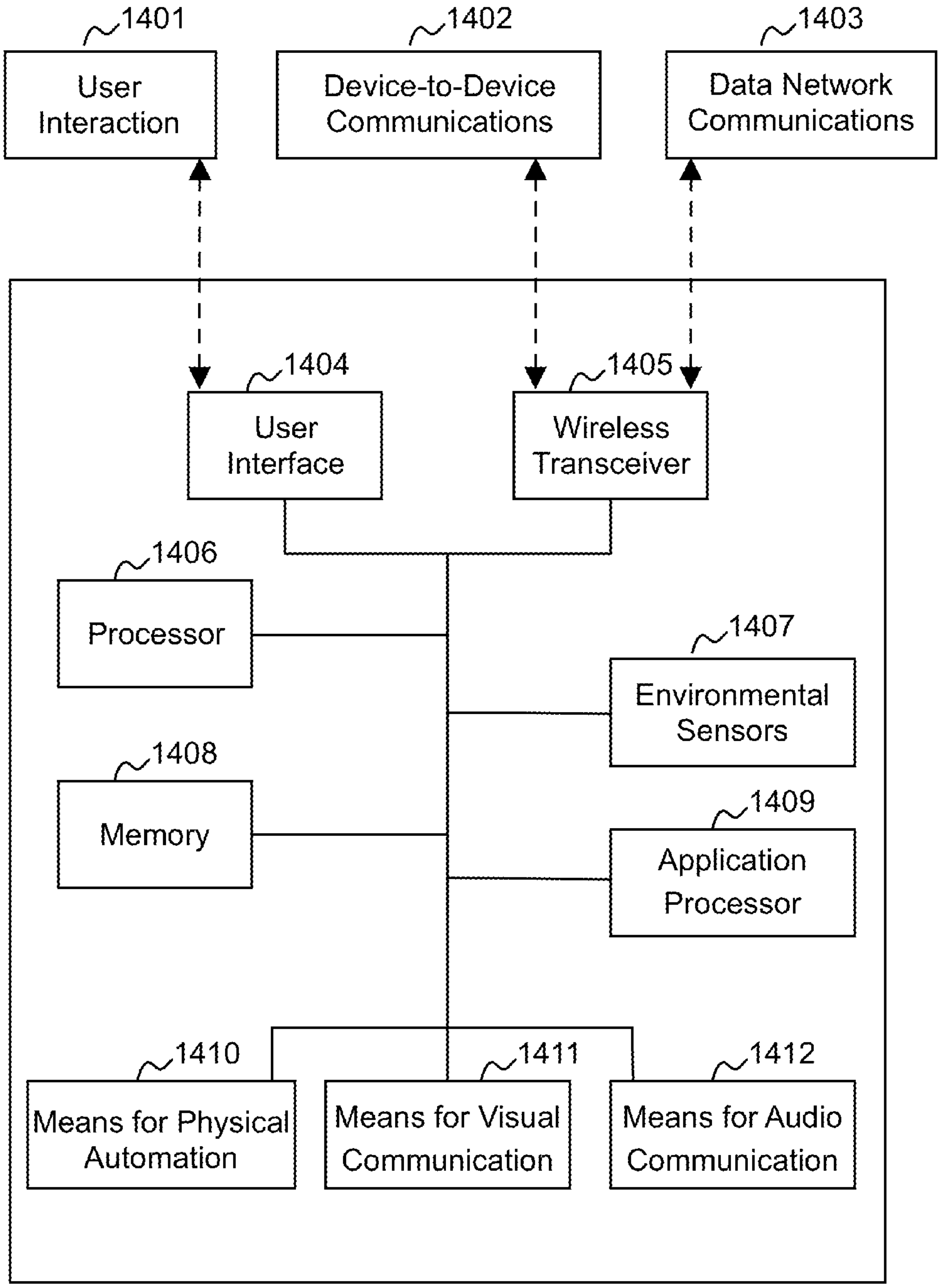
FIG. 14 is a functional block diagram of a Roadside Unit according to an exemplary embodiment of the disclosure.

Referring to FIG. 14, a Roadside Unit may include components such as a user interface 1404 for user interaction 1401 by the Road User; a wireless transceiver 1405 for direct device-to-device communications 1402 and data network communications 1403; a processor 1406 for handling functions such as display, wireless communications and power management; environmental sensors 1407 for collecting and measuring data related to environmental factors (e.g. air quality, air constituent parts, moisture, sound, etc.); memory 1408 for storing collected data, received Vulnerability State Messages and processor-readable instructions; an application processor 1409 for handling all smart functions related to applications run on the device (e.g. memory management, graphics processing and multimedia decoding); means of physical automation 1410 for physical adjustment to the Roadside Unit (e.g. changing the shape, or form, or position, or posture of the Roadside Unit through electromechanical, hydraulic, or other means); means for visual communication 1411 such as a display for presenting information (e.g. as text, graphics, infographics, flashing lights, changing colors, etc.); and means for audio communications 1412 (e.g. beeping, alert sound, music, vocal output, aural aid, etc.).

The user interface 1404 may be adapted to provide tactile feedback to a Road User e.g. kinesthetic vibration, force feedback, ultrasound beams, etc.

Figure 10:
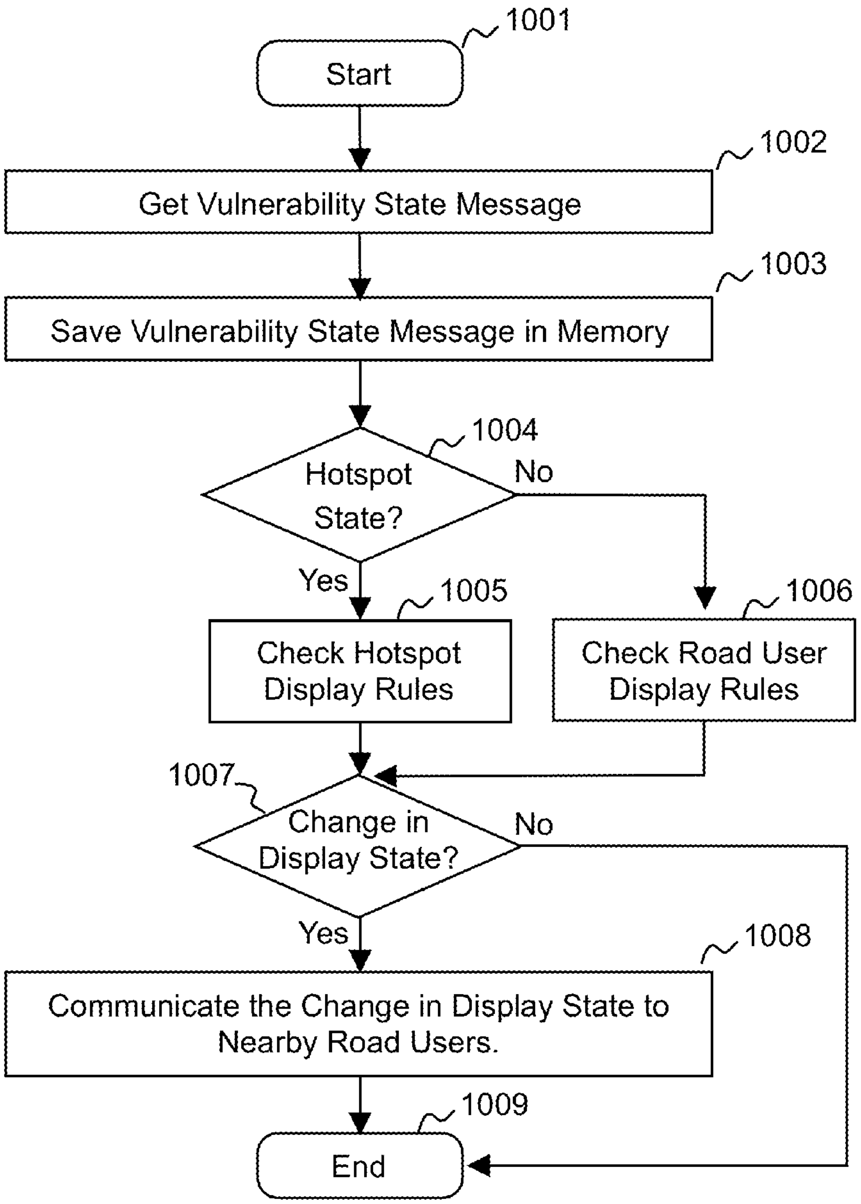
FIG. 10 is a flow diagram of an exemplary method for Roadside Vulnerability Reporting.

Referring to FIG. 10, the system and method may be configured to communicate Vulnerability State data to Road Users about a Vulnerability Hotspot Location using a Roadside Unit by: receiving a Vulnerability State Message 1102 from at least one of a Vulnerability State Server, a Road User Device and a Roadside Unit; saving the Vulnerability State Message in memory 1003; referencing rules stored in memory for communicating Vulnerability State data associated with a Vulnerability Hotspot Location 1005 upon confirming that the Vulnerability State Message is associated with a Vulnerability Hotspot Location 1004; determining whether the received Vulnerability State Message indicates a change in the Display State of a Roadside Unit 1107; and, upon confirming a change in the Display State, communicating the change in the Display State to nearby Road User using at least one of means for visual communication, means for audio communication and means for physical automation.

In an exemplary embodiment of the system and method for Roadside Vulnerability Reporting, a Roadside Unit such as a Variable Messaging Sign 104*a* may display information to nearby Road Users to warn them about a Vulnerability Hotspot Location, or a Roadway Incident. The information displayed may be text, graphics, infographics, flashing lights, changing colors or other types of visual information, or a combination of those. The Variable Messaging Sign may also be configured to display personal messages for nearby or approaching Road Users, e.g. to warn a Road User that they are moving too fast or to alert them about the status of a particular Vulnerability State Factor or to display traffic rules that are personal to the Road User. In this way, the Variable Messaging Sign may adjust its display for each passing Road User according to their personal Vulnerability State.

In another example, a Roadside Unit such as a Road Surface Unit 104*b* may be configured to associate a measurement of a passing Road User's Vulnerability State data with other measurements collected by the Roadside Unit such as throughput analysis, enabling a Roadway Administrator to better associate and analyze throughput and Vulnerability State performance at that location or throughout an entire geographic region.

In another example, a Roadside Unit may be configured to visually display to passing vehicles a message that a Vulnerable Road User is present and wishes to cross a road. For example, a Road Surface Unit 104*b* embedded in a curb or sidewalk pavement may be configured to display a light, or colored light, or flashing light, or other such visual patterns, to indicate the presence of the Vulnerable Road User. Alternatively, a crosswalk pattern may be lit up in anticipation of the Vulnerable Road User crossing the road, or in anticipation of a threshold count of Vulnerable Road Users crossing the road.

In another example, a Roadside Unit such as a Roadside Imaging System may be configured to associate Road User imaging data (e.g. photograph, video, ultrasound image, or other recorded image) with Vulnerability State data. The Roadside Imaging System may be initiated upon a determination that a Vulnerable Road User is present, or that a Vulnerability Hotspot Location threshold has been reached.

In another example, a Traffic Signal Unit 104*d* may be configured to update its display in response to a receipt of a Vulnerability State Message. In this way, the traffic signal light sequencing rules may be updated in response to a determination that a Vulnerable Road User is in close proximity; or that a threshold amount of Road Users is nearby; or that a Vulnerability Hotspot has been confirmed. A Road User may be able to initiate a change in the Traffic Signal sequencing rules by engaging with a user interface associated with the Road User Device or the Traffic Signal Unit. This would enable a Road User who feels particularly vulnerable to request a green light to cross a street, or other such communications by a Roadside Unit. Information about the presence or Vulnerability State of a Road User may also be displayed to nearby Road Users on a variable messaging sign, or communicated as a Vulnerability State Message to nearby Road User Devices, or through other communications means.

In another example, a Road Signal Unit 104*e* may be configured to respond to receiving a Vulnerability State Message by communicating path guidance or warnings to Road Users. This communication may take place through visual communications means, such as flashing a light as part of a road stud. The communication may also take place through means for physical automation, such as deploying a lane divider, bollard or speed bump. In this way, the system and method for Roadside Vulnerability Reporting may be configured to dynamically guide traffic into particular lanes, or sections of the road; to create more space for Vulnerable Road Users, such as a dynamically assigned cycle path or emergency services lane; to create on-road warning signals; to re-route traffic; or guide an individual Road User along an optimal path.

In another example, a Mounted Roadside Unit 104*f* may be positioned mounted on a surface such as a wall or pole, either permanently or temporarily, to enable communications with nearby Road User Devices and the Vulnerability State Server.

In another example, a Road Barrier 104*g* or access gate may be configured to open or close in response to receiving a Vulnerability State Message. This may be useful in periods of high volumes of vehicular traffic to protect Vulnerable Road Users.

In another example, a Communications Roadside Unit 104*h* may be configured to optimize communication of Vulnerability State Messages without any roadside display means by relaying or passing through Vulnerability State Messages from one device to another device, or by boosting signal strength of the data network or direct device-to-device communications means.

Any form of Roadside Unit may be configured to dynamically update traffic rules or traffic rule displays for the nearby geographic area. For example, the speed limit for any mode of travel in the area may be reduced or increased in accordance with the determined Vulnerability State of the geographic area or at least one nearby Road User. Other traffic rules may similarly be adjusted, such as lane access rules, parking rules, road space adjustments, traffic signaling, etc.

Any Roadside Unit may also communicate with other Roadside Units for improving the efficiency of the connected infrastructure, improving traffic flow, or improving road safety. For example, a Vulnerability State Message may be sent from one Roadside Unit to another one to enable coordinated or progressive or successive traffic signaling, such as a Pedestrian Green Wave. A Pedestrian Green Wave may comprise communicating a Vulnerability State Message from a Roadside Unit to another Road Unit associated with at least one Road User Device to enable preferential treatment such as prioritized green lights for the Road User. Similarly, a Roadside Unit may receive a communication from another Roadside Unit to present successive messages as a visual display to a passing Road User at multiple points along the same road segment, such as a personalized message associated with the Road User's Vulnerability State.

A Roadside Unit may also be configured to afford preferential traffic rules to a particular Road User, or type of Road User, or Road User Cluster. For example, a Roadside Unit may initiate a coordinated or cascading Green Wave of green traffic lights for Emergency Service Vehicles, or a Vulnerable Road User, or a Roving Vulnerability Hotspot.

In another example, a Roadside Unit may be configured to afford preferential traffic rules to Road Users that have demonstrated excellent travel behavior associated with road safety, e.g. a vehicle that has historically always adhered to traffic signaling rules may automatically be conferred with special privileges that result in a green traffic light priority. The Vulnerability State of a Road User may include reference to a Road Safety summary score based on their historical Vulnerability State data.

In another example, a Road User may be able to acquire or earn or purchase preferential traffic rule treatment such as green light prioritization, lane assignment, or increased Vulnerability State, or preferential treatment in a hierarchical collision rule set associated with autonomous vehicles.

A difficult moral dilemma arises in this case of an autonomous vehicle needing to decide which of at least two Road Users should be avoided in a collision scenario that provides no alternative to a collision occurring. If at least one Road User must be collided with, then clear rules must be provided to guide optimal driving behavior of the vehicle. Artificial Intelligence, machine learning and deep learning requires ethical training or embedded ethics to ensure that decisions are made according to an optimal set of values. A Vehicle Device may be configured to include Vulnerability State data as part of its decision making in this scenario, thereby enabling Vulnerable Road Users to have their safety prioritized in a collision scenario.

Figure 16:
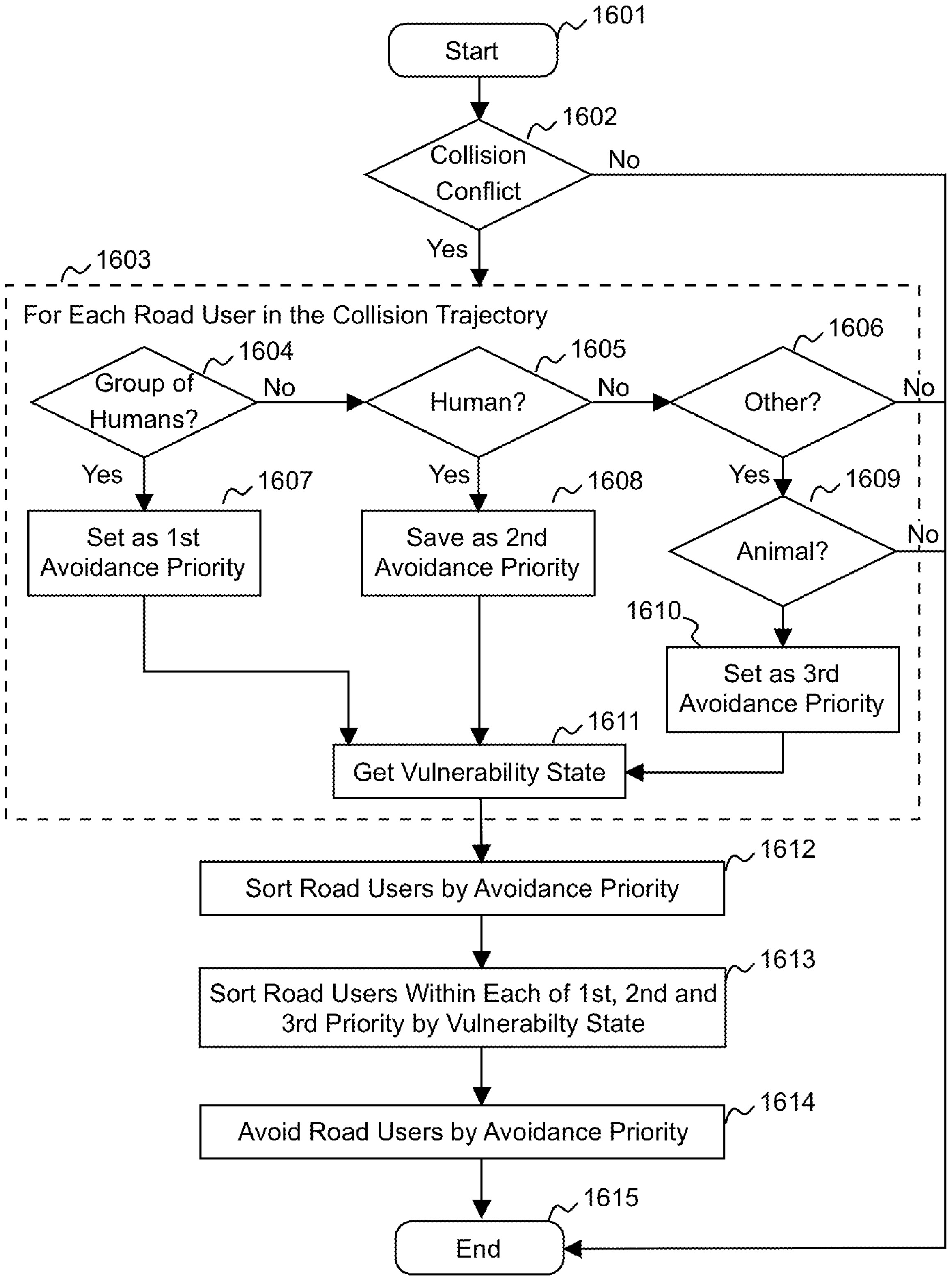
FIG. 16 is a flow diagram of an exemplary method for a Vehicle Device to determine which of at least two Road Users to collide with in an ethical collision dilemma.

Referring to FIG. 16, the method of including Violation State data in a determination of which of at least two Road Users should be avoided may comprise: confirming that a collision conflict exists, requiring the vehicle to decide with which of at least two Road Users in its collision trajectory it should collide 1602; for each Road User in the collision trajectory, assigning a group of co-located human Road Users 1604 to a First Avoidance Priority Set 1607, assigning a single human Road User 1605 to a Second Avoidance Priority Set 1608, assigning an animal Road User 1609 to a third Avoidance Priority Set 1610, getting a Vulnerability State for each Road User 1611; sorting each Road User by their assigned Avoidance Priority 1612; sorting Road Users within each of the First Avoidance Priority Set, the Second Avoidance Priority Set and the Third Avoidance Priority Set by Vulnerability State to ensure that Vulnerable Road Users have their road safety prioritized over less Vulnerable Road Users 1613; and applying avoidance behavior to each Road User by their assigned avoidance priority 1614. In this way, a vehicle equipped with a Vehicle Device can make better collision decisions that prioritize Vulnerable Road User safety in this difficult ethical dilemma. It may be possible for a Roadway Administrator to configure regulations to govern decision making in this scenario using the Roadway Administration System. It may also be possible to view a collision audit following a collision, comprised of collated Vulnerability State Messages, to better understand how a collision determination unfolded.

Road User Vulnerability State Black Box Reporting:

In another embodiment, the Road User Vulnerability State Classification and Reporting system and method may be applied to Road User Vulnerability State Black Box Reporting, i.e. enabling analytical reports of collated Vulnerability State data.

The system and method may be configured to collect and save Vulnerability State Message for the purposes of analyzing and better understanding Road User Vulnerability States. In this way, it may act akin to an airplane flight data recorder, or Black Box, recording data associated with Vulnerability States throughout the connected transportation infrastructure and collating this data for evidential analysis.

In an exemplary embodiment of the system and method for Road User Vulnerability State Black Box Reporting, the system and method may be configured to enable analytical reports for roadway administration. A Roadway Administrator may be able to use a user interface associated with a Roadway Administration System to view collated Vulnerability State data for a particular time period, or recurring time period, and associated with at least one of a particular geographic area, or particular Road User, or group of Road Users, or particular Road User type, or group of Road User types, or particular Roadside Unit or group of Roadside Units, or for other purposes.

For example, the Roadway Administrator may wish to better understand road usage at a particular road segment for peak travel periods over the previous 6 months. By collating Vulnerability State Messages associated with Road User Devices present in the geographic area for that time period, it is possible to present information useful for analysis. This useful information may comprise a summary of patterns or trends associated with Vulnerability States as the Road Users traveled through the geographic area. It may be presented as text, graphics, infographics, map displays, map display layers or overlays, graphs, charts, etc. By presenting this useful information, the Roadway Administrator may discover, for example, that vehicles tend to break traffic rules such as traffic speed or traffic signal rules in certain circumstances; or that a Vulnerability Hotspot Location tends to occur at particular times; or that Roadway Incidents, such as collisions, occur more frequently at particular intersections. In another example, the Roadway Administrator may be able to view a representation of traffic flow throughput throughout a geographic region. The Roadway Administrator is then armed with insights that can be applied to improve road safety.

The Roadway Administrator may be able to use the Roadway Administration System to reconfigure traffic rules (e.g. traffic signal timing; traffic speed limits; etc.); or rules for Roadside Unit displays (e.g. lane adjustments; information displays); or Vulnerability State calculation rules; or Vulnerability Hotspot Location rules; or Roadway Incident identification rules, or other such rules etc.

The above information may include historical data and/or real time data. A Roadway Administrator may wish to view Vulnerability State data in real time for a particular geographic area, such as a roadway segment, or for an entire road network. For example, a heatmap display of Vulnerability States may enable a Roadway Administrator to reconfigure the connected transportation infrastructure and associated rules in real time; or to allocate resources (such as law enforcement or emergency personnel) to particular geographic areas.

The Roadway Administration System may also be configured to automatically identify and highlight potential improvements to the road infrastructure, or connected transportation infrastructure, or areas where more Roadside Units should be positioned, or to traffic rules.

For example, upon an automated determination that a threshold amount or percentage of vehicles break traffic signal rules, or cut corners, or travel too fast; the system may communicate a suggested change in traffic rules or an upgrade to road infrastructure to the Roadway Administrator. It may also be advantageous for those suggested changes to be implemented automatically or dynamically. For example, if it is determined that vehicles are cutting corners at a particular road segment, the Vulnerability State Server may send a Vulnerability State Message to a nearby Roadside Unit to automatically adjust the infrastructure (e.g. re-allocate road space, or re-assign lanes, or introduce a bollard or barrier to obstruct vehicles from cutting the corner). In this way, the Vulnerability State Server can automatically identify threats to road safety and initiate improvements that protect road safety in real time. It may also be configured to send a Vulnerability State Message to a Roadway Administrator associated with issuing a legal citation to offending Road Users or Vehicles.

In another exemplary embodiment of the system and method for Road User Vulnerability State Black Box Reporting, the system and method may be configured to enable personal analytical reports for an individual Road User. A Road User may wish to better understand their collated personal Vulnerability State data over time, for a particular geographic area, or group of geographic areas, for a particular journey, or group of journeys, and for other purposes. By collating a Road User's Vulnerability State Messages over time, it is possible to provide useful information to the Road User on a user interface associated with the Road User Device that enables them to better understand their road safety vulnerability and make more informed decisions about their future travel behavior.

For example, a pedestrian Road User may wish to visually play back their personal Vulnerability State Black Box data over the past week on a user interface associated with their Road User Device to visually understand where they are most vulnerable on their commute. Collated Vulnerability State data could be presented, for example, on a map with overlays or layers to represent particular locations at which the Road User has historically been most vulnerable; or locations at which the Road User should adjust their behavior to improve their road safety. It could also be configured to present overlays for time, so that a user could play back their Vulnerability State sequentially for a given time period. Vulnerability State data could be presented in any of a number of ways, including text, graphics, infographics, charts, maps, etc. It may also be combined with real-time data.

As another example, while out running, a Road User may check a smartwatch (or other Road User Device) to see their current Vulnerability State or to see a chart of their historical Vulnerability State data, or an infographic of how their current Vulnerability State compares to historical data.

The collated Vulnerability State data may relate to the user's complete set of Vulnerability State data, or a subset of data related to individual Vulnerability State Factors. For example, it may be advantageous for the Road User to select a particular Vulnerability State factor or group of factors (e.g. cardiac performance or Proximity Factors). The user interface associated with the Road User device may be configured to present options for the Road User to select the Vulnerability State data of most interest.

It may also be desirable to present a Road User with their collated Vulnerability State data combined with collated Vulnerability State data associated with at least one other Road User. For example, this would allow a Road User to compare their Vulnerability State data with a friend's, or with a group of anonym ized Road Users who travel along the same geographic path, or within the same geographic area. This may be useful in informing the Road User whether their travel is more or less vulnerable than other Road Users.

The collated Vulnerability State data could also be used to recommend an alternative travel path to the Road User that would better preserve their road safety.

The collated Vulnerability State data could also be communicated to the Road User using other means of user interaction, including aural communication means or tactile communication means. For example, it may be desirable to issue audio guidance, or haptic feedback, to a Road User at a particular location associated with their collated personal Vulnerability State data, such as relating to an area of increased vulnerability.

A Roadway Administrator with certain user rights on the Roadway Administration system may also be to access and view Vulnerability State data associated with an individual Road User or group of Road Users.

In another exemplary embodiment of the system and method for Road User Vulnerability State Black Box Reporting, the system and method may be configured to provide collated Vulnerability State data as part of an evidence package in the adjudication of Roadway Incident causation.

For example, an adjudication process associated with a legal process (e.g. courts; traffic citations, etc.) may be configured to receive collated Vulnerability State data associated with a particular Roadway Incident.

Referring again to FIG. 12, the collated Vulnerability State data may relate to those users identified as likely involved in the Roadway Incident with a high degree of certainty, but also those users identified as geographically nearby to the Roadway Incident.

For example, in the case of a vehicle-pedestrian collision, it may be useful to collate Vulnerability State data from the pedestrian Road User device and the Vehicle Device, as well as Vulnerability State data associated with nearby Road Users who may be potential witnesses. By presenting the collated Vulnerability State on a user interface associated with the Roadway Administration system, it may be possible to identify the cause of the collision. For example, whether the vehicle broke traffic rules (e.g. speed limit, traffic signaling, lane assignment, etc.) or whether the pedestrian Road User was illegally crossing the road, or whether there was a fault in the connected transportation infrastructure, or whether a road hazard was present nearby (e.g. uncontrolled animal), etc.

The user interface associated with the Roadway Administration system may be able to display, or otherwise communicate, the collated Vulnerability State data associated with the particular Roadway Incident as a Black Box evidence package. This Black Box data could be useful in the same way that an airplane flight data recorder or Black Box may be useful in identifying the cause of an airplane accident. The user interface may be configured to play back the Vulnerability State data sequentially. It may also be configured to present options for a Roadway Administrator to select particular Vulnerability State factors, or other sets of Vulnerability State data, or Vulnerability State data associated with a particular Road User or group of Road Users.

The collated Vulnerability State data may also include Vulnerability State Messages communicated by a nearby Roadside Unit.

An adjudication process may also comprise analysis of other forms of Roadway Incidents, such as a traffic bottleneck, or connected infrastructure fault, or a recurring Roadway Incident pattern, etc. In this case Vulnerability State data may be presented to a Roadway Administrator for the purposes of better understanding what may have caused the Roadway Incident. For example, Vulnerability State data from vehicles associated with a build-up of traffic may not indicate the cause, but when combined with Vulnerability State from a nearby Road User device or a nearby Roadside Unit it may be evident that a sudden change in the state of a particular Road User (e.g. associated with a medical emergency) or a particular Vulnerability State Factor (e.g. weather conditions) may indicate the cause.

The system and method may also be configured to communicate the collated Vulnerability State data to an external adjudication system, such as a court system or insurance system, etc.

It may be advantageous in the context of Road User insurance to adjudicate a particular insurance claim based on collated Vulnerability State data of at least one Road User.

For example, for a particular vehicle-to-vehicle collision, an insurance company may reference collated Vulnerability State data from both Vehicle Devices, from nearby Roadside Units, or from other nearby Road Users to build up an understanding of who caused the collision. Absent this data, it may not be possible to accurately assign accountability to one party. However, with this data, it may become clear that a particular Road User was distracted, or inebriated, or asleep, or lacking care for traffic rules, or otherwise responsible. The supporting collated Vulnerability State data may be communicated as part of the adjudication process as an evidence package by a Roadway Administration System, the Vulnerability State Server, a Road User Device, or a Roadside Unit. The supporting collated Vulnerability State data may also include Vulnerability State from at least one nearby Road User.

It may also be advantageous to associate insurance premiums with Vulnerability State data. For example, a Road User with a historical record of low Vulnerability States or model Road User behavior or accordance with traffic rules, may be assigned a lower premium cost than a Road User with a more frequent experience of a high Vulnerability State. This would allow an insurer to assign insurance premium costs according to Road User behavior, including modal choices or travel paths. The system and method may be configured to share such collated Vulnerability State data with an external system shared with the Insurer. It may also be desirable to make this data transparent, so that a Road User knows at all times how they are performing with regards to other Road Users, or whether they are in danger of entering a new Vulnerability State tier associated with higher or lower insurance premiums.

To improve the reliability and accuracy of Black Box evidence packages, it may be advantageous to include Vulnerability State data from nearby Road Users not directly associated with a particular Roadway Incident. For example, a nearby Road User may be a witness to the incident, or their Road User Device may have data that would improve the usefulness of the Black Box evidence package.

Therefore, the system and method of Road User Vulnerability State Black Box reporting may be configured to automatically identify and communicate with nearby Road Users by: identifying at least one Road User within a geographic proximity to a known Roadway Incident; collecting Vulnerability State data associated with the Road User for the determined Roadway Incident time period; and collating this collected Vulnerability State data with the Roadway Incident Black Box data set.

The system and method of Road User Vulnerability State Black Box reporting may further be configured to enable a Road User to choose whether to share their personal Vulnerability State data as part of the Roadway Incident Black Box data set.

Figure 17:
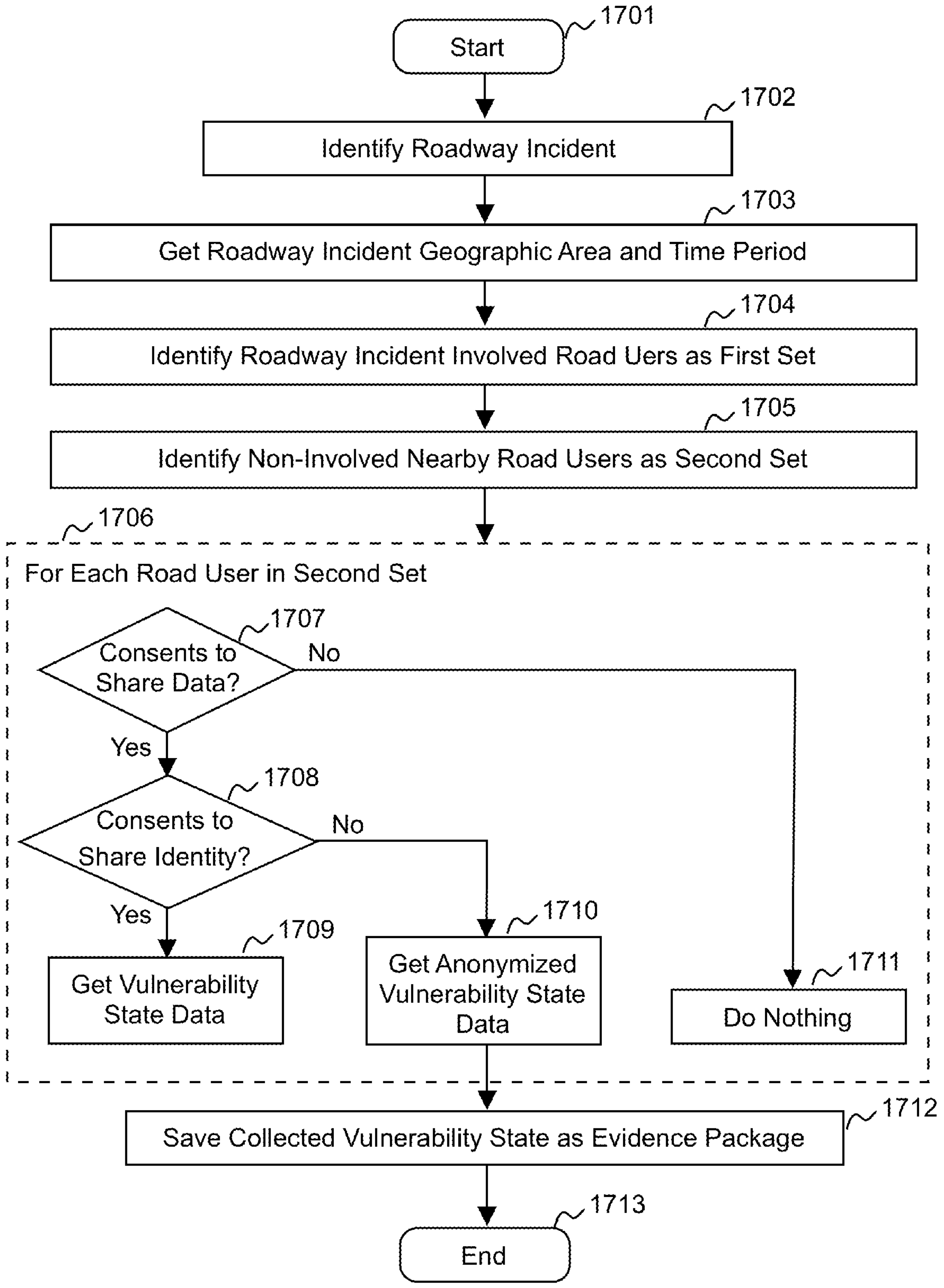
FIG. 17 is a flow diagram of an exemplary method for receiving Vulnerability State data associated with potential witnesses to a Roadway Incident.

Referring to FIG. 17, this method may comprise: identifying a Roadway Incident 1702; getting the geographic area and time period associated with the identified Roadway Incident 1703; identifying Road Users directly involved in the Roadway Incident as a First Set of Road Users 1704; identifying Road Users not directly involved in the Roadway Incident but within a close proximity of the Roadway Incident as a Second Set of Road Users 1705; for each Road User in the second set 1706, getting the Road User's Vulnerability State data for the Roadway Incident time period 1709 if they consent to share their data 1707 and their personal identity 1708, or getting anonymized Vulnerability State data for the Road User 1710 if they consent to share their Vulnerability State data 1707 but do not consent to share their personal identity 1708; and saving the collected Vulnerability State data as a Roadway Incident Evidence Package.

In this way, it may be easier to identify and incorporate useful information from witnesses to the Roadway Incident in a way that preserves the privacy of those witnesses.

In another exemplary embodiment of the system and method for Road User Vulnerability State Black Box Reporting, the system and method may be configured to display real-time or historical collated Vulnerability State data on a map.

A user interface associated with a Road User device, or with a Roadway Administration System may be configured to include this Vulnerability State data as a layer or overlay for the purpose of enabling a Road User, or Roadway Administrator, to better understand the Vulnerability State of a particular geographic area.

For example, a Road User may wish to inspect a map prior to departing on a journey to better understand the current Vulnerability State of their path of travel. The user interface associated with the Road User device may allow the Road User to optionally zoom in on a particular geographic location and see anonymized real time Vulnerability State data associated with the geographic area or within individual Road Users. Depending on the Road User's map zoom level preferences, the map could include, for example, real time positional updates associated with a Road User device currently traveling in that geographic area. The positional updates could further include other Vulnerability State Factor data such as modal factors, biometric factors, biographical factors, etc. The map could further be configured to enable someone to isolate data associated solely with pedestrians, or vehicles, or types of vehicles, or groups of such Road Users. The map could further be configured to display Vulnerability Hotspot Locations or Roving Hotspots or Roadway Incidents. The map could also be configured to display a Road User's own collated personal Vulnerability State data, e.g. to present where on their regular commute path their road safety is determined to be most vulnerable.

In another example, a Roadway Administrator at a traffic operations center may use the map to zoom in on a particular road segment to better understand the Vulnerability State of Road Users in the area.

This could also enable a Road User or Roadway Administrator to view or track the movements of a particular Road User, or group of Road Users, or a Road User Cluster, or Roving Vulnerability Hotspot associated with a group of Vulnerable Road Users on a particular journey for monitoring their safe passage to and arrival at a destination. For example, a Road User may wish to subscribe to the movements of a particular Rod User or group of Road Users and be notified of changes to their Vulnerability State or to their arrival at a particular location, such as a known destination. This would example, for example, a parent or school to monitor the safe passage of school children on their journey to or from school. For increased security, the system and method could be figured to optionally require a Road User to opt in to be included in such a Vulnerability State tracking system, or to opt out of inclusion in the map display.

In another example, the map display could be configured to include a layer for presenting historical data.

In another example, the collated Vulnerability State could be displayed as part of an external system's map display.

In another example, the collated Vulnerability State data may be used to automatically adjust the map display to improve the accuracy of the map objects (e.g. road or lane position) based on positional data in the collated Vulnerability State data.

Throughout the foregoing description, for the purposes of explanation, numerous specific details were set forth in order to provide a detailed understanding of the disclosure. It will be apparent, however, to one skilled in the art that the disclosure may be practiced without some of these specific details. Accordingly, the scope and spirit of the disclosure should be judged in terms of the claims which follow.

What is claimed is:

1. A computer-implemented method of identifying and reporting a Vulnerability Hotspot Location by a road safety system, the method comprising:
receiving, by the road safety system, a first Vulnerability State Message from a first Road User Device associated with a first Road User, wherein said first Vulnerability State Message contains positional data and at least one of modal data, environmental data, self-declared data, proximity data, data related to other Road Users, biographical data, and biometric data;
determining, by the road safety system, that said first Road User Device is located within a first geographic area;
calculating, by the road safety system, a first Vulnerability State summary value associated with said first Road User;
receiving, by the road safety system, a second Vulnerability State Message from a second Road User Device associated with a second Road User at approximately the same time, wherein said second Vulnerability State Message contains positional data and at least one of modal data, environmental data, self-declared data, proximity data, data related to other Road Users, biographical data, and biometric data;
determining, by the road safety system, that said second Road User Device is located within said first geographic area;
calculating, by the road safety system, a second Vulnerability State summary value associated with said second Road User;
collating, by the road safety system, said first Vulnerability State Message with said second Vulnerability State Message;
calculating, by the road safety system, an aggregate Vulnerability State summary value associated with said first geographic area;
comparing, by the road safety system, said aggregate Vulnerability State summary value with a first threshold amount;
determining, by the road safety system, that said aggregate Vulnerability State summary value has reached said first threshold amount; and
setting, by the road safety system, said first geographic area as a Vulnerability Hotspot Location.

2. The method of claim 1, further comprising adjusting, by the road safety system, traffic rules associated with said first geographic area.

3. The method of claim 1, further comprising communicating, by the road safety system, a warning message to said first Road User Device and said second Road User Device.

4. The method of claim 1, further comprising communicating, by the road safety system, a warning message to a third Road User Device approaching said first geographic location.

5. The method of claim 1, further comprising updating, by the road safety system, a visual display associated with a Roadside Unit located within said first geographic area to warn nearby Road Users about said Vulnerability Hotspot Location.

6. The method of claim 1, further comprising identifying, by the road safety system, said Vulnerability Hotspot Location as a particular category of Roadway Incident.

7. The method of claim 1, further comprising displaying, by the road safety system, said Vulnerability Hotspot Location in a map on a user interface associated with a Roadway Administration System.

8. The method of claim 1, further comprising displaying, by the road safety system, said Vulnerability Hotspot Location in a map on a user interface associated with a Road User Device.

9. The method of claim 1, further comprising updating the traffic signal sequencing rules associated with a Traffic Signal Unit located within said first geographic area.

10. The method of claim 1, further comprising collating said first Vulnerability State Message and said second Vulnerability State Message with data received from a Roadside Unit located within said first geographic area at approximately the same time and calculating an updated aggregate Vulnerability State summary value for said first geographic area.

11. The method of claim 1, further comprising ending, by the road safety system, the Vulnerability Hotspot state of said first geographic area upon at least one of an expiration of a time period, manual adjustment by a Roadway Administrator using a user interface associated with said Roadway Administration System, and a determination that said aggregate Vulnerability State summary value is below said first threshold amount.

12. The method of claim 1, further comprising updating, by the road safety system, the Vulnerability Hotspot state of said first geographic area in response to identifying a trend in historical Vulnerability State data associated with said first geographic area.

13. A computer system for identifying and reporting a Vulnerability Hotspot Location in a road safety system, the system comprising:
a memory having processor-readable instructions stored therein;
a processor configured to access the memory and execute the processor-readable instructions which, when executed by the processor, configure the processor to perform a plurality of functions comprising:
receiving a first Vulnerability State Message from a first Road User Device associated with a first Road User, wherein said first Vulnerability State Message contains positional data and at least one of modal data, environmental data, self-declared data, proximity data, data related to other Road Users, biographical data, and biometric data;
determining that said first Road User Device is located within a first geographic area;
calculating a first Vulnerability State summary value associated with said first Road User;
receiving a second Vulnerability State Message from a second Road User Device associated with a second Road User at approximately the same time, wherein said second Vulnerability State Message contains positional data and at least one of modal data, environmental data, self-declared data, proximity data, data related to other Road Users, biographical data, and biometric data;
determining that said second Road User Device is located within said first geographic area;
calculating a second Vulnerability State summary value associated with said second Road User;
collating said first Vulnerability State Message with said second Vulnerability State Message;
calculating an aggregate Vulnerability State summary value associated with said first geographic area;

comparing said aggregate Vulnerability State summary value with a first threshold amount;

determining that said aggregate Vulnerability State summary value has reached said first threshold amount; and saving said first geographic area as a Vulnerability Hotspot Location.

14. The system of claim 13, wherein said first Vulnerability State Message and said second first Vulnerability State Message are communicated using at least one of a data network and device-to-device communications.

15. A non-transitory computer readable medium comprising processor-readable instructions which, when executed by a processor, configure the processor to perform a plurality of functions for classifying and reporting Road User Vulnerability State, the plurality of functions comprising:

receiving, by the road safety system, a first Vulnerability State Message from a first Road User Device associated with a first Road User, wherein said first Vulnerability State Message contains positional data and at least one of modal data, environmental data, self-declared data, proximity data, data related to other Road Users, biographical data, and biometric data;

determining, by the road safety system, that said first Road User Device is located within a first geographic area;

calculating, by the road safety system, a first Vulnerability State summary value associated with said first Road User;

receiving, by the road safety system, a second Vulnerability State Message from a second Road User Device associated with a second Road User at approximately the same time, wherein said second Vulnerability State Message contains positional data and at least one of modal data, environmental data, self-declared data, proximity data, data related to other Road Users, biographical data, and biometric data;

determining, by the road safety system, that said second Road User Device is located within said first geographic area;

calculating, by the road safety system, a second Vulnerability State summary value associated with said second Road User;

collating, by the road safety system, said first Vulnerability State Message with said second Vulnerability State Message;

calculating, by the road safety system, an aggregate Vulnerability State summary value associated with said first geographic area;

comparing, by the road safety system, said aggregate Vulnerability State summary value with a first threshold amount;

determining, by the road safety system, that said aggregate Vulnerability State summary value has reached said first threshold amount; and setting, by the road safety system, said first geographic area as a Vulnerability Hotspot Location.

* * * * *